Figure 1:
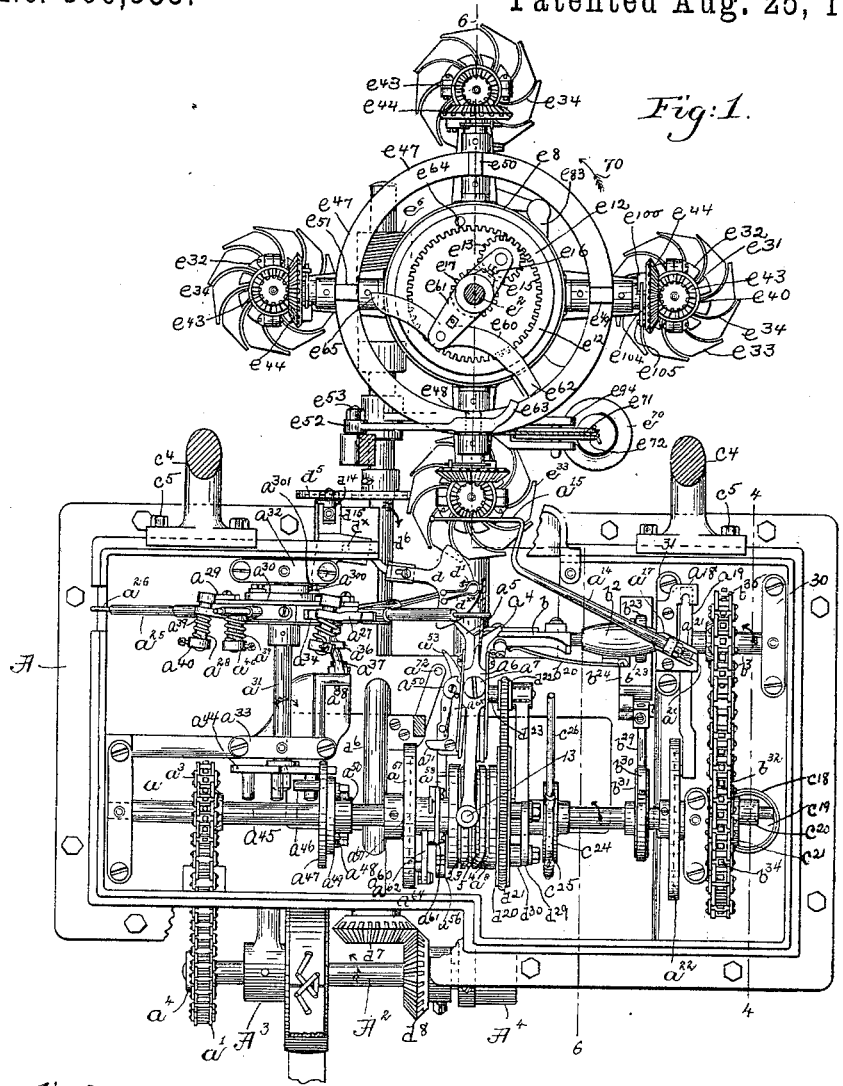

(No Model.) 9 Sheets—Sheet 1.

J. P. SWIFT.
TAG TYING AND BUNCHING MACHINE.

No. 566,353. Patented Aug. 25, 1896.

Witnesses.
Howard F. Eaton.
J. Murphy.

Inventor:
John P. Swift
by Jas. H. Churchill
Atty.

(No Model.) 9 Sheets—Sheet 2.

J. P. SWIFT.
TAG TYING AND BUNCHING MACHINE.

No. 566,353. Patented Aug. 25, 1896.

Witnesses.
Howard J. Eaton.
J. Murphy.

Inventor:
John P. Swift
by Jas. H. Churchill
Atty.

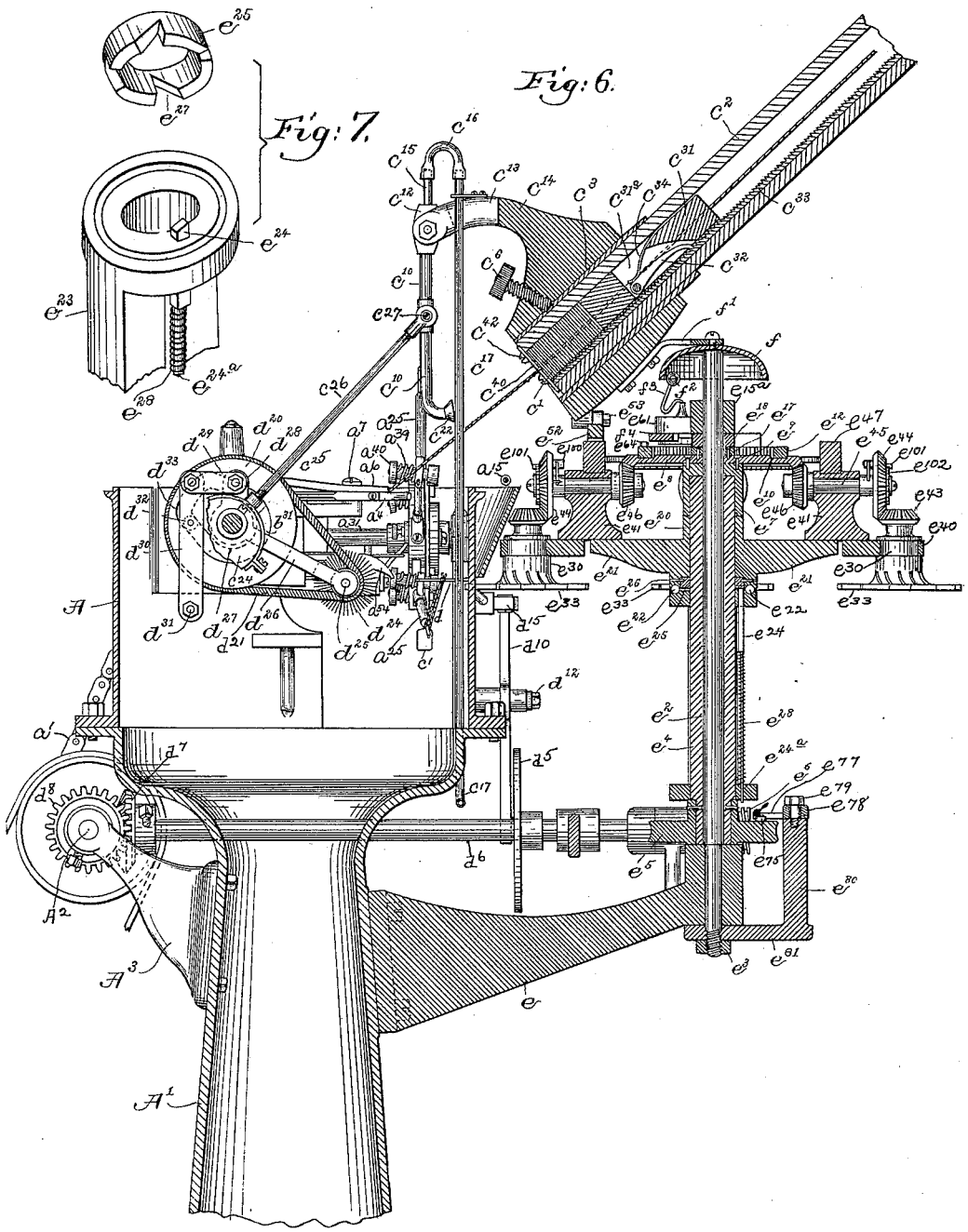

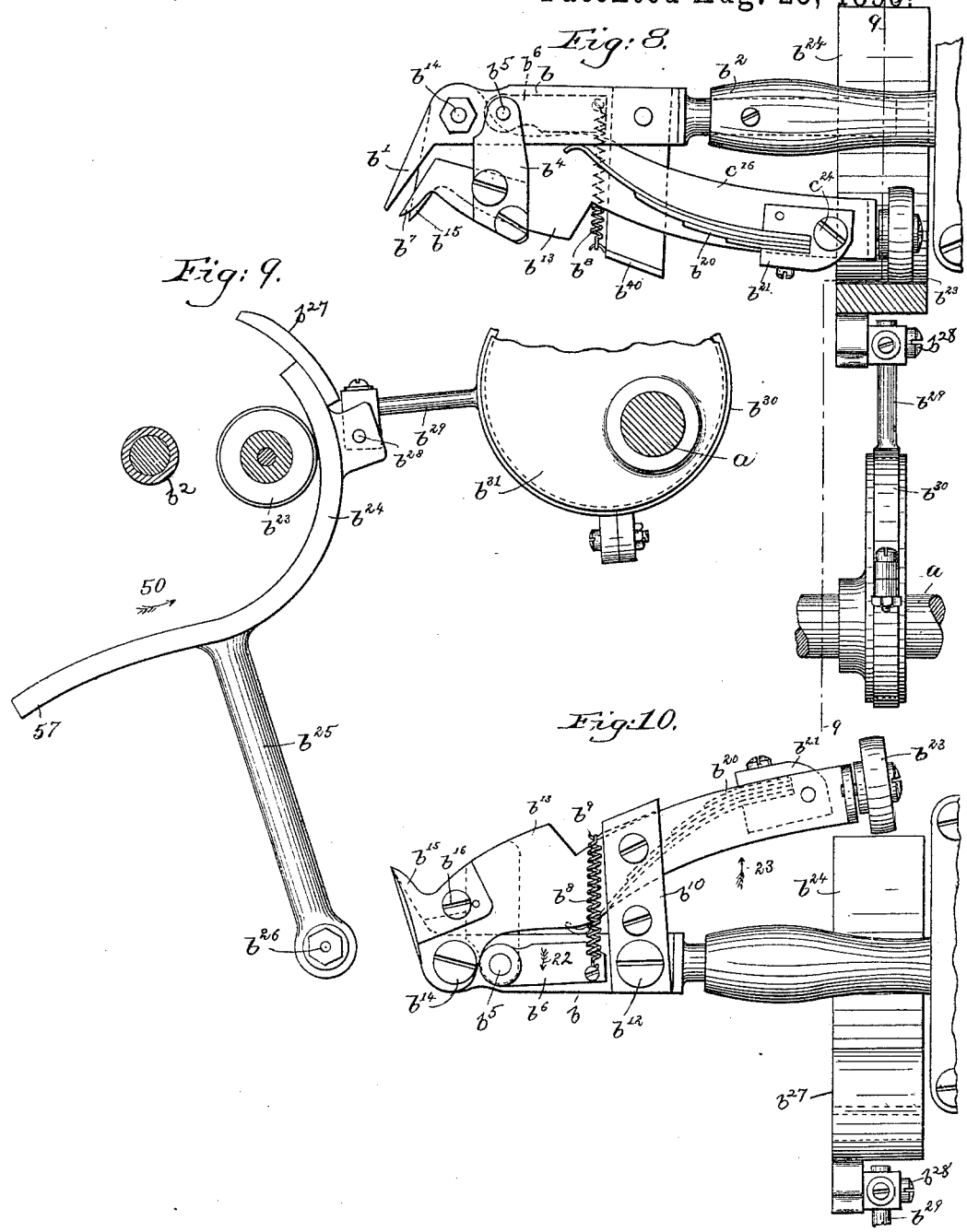

(No Model.) 9 Sheets—Sheet 5.
J. P. SWIFT.
TAG TYING AND BUNCHING MACHINE.
No. 566,353. Patented Aug. 25, 1896.
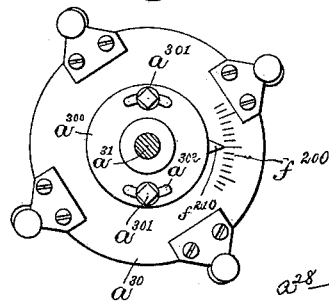
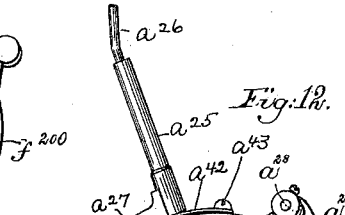
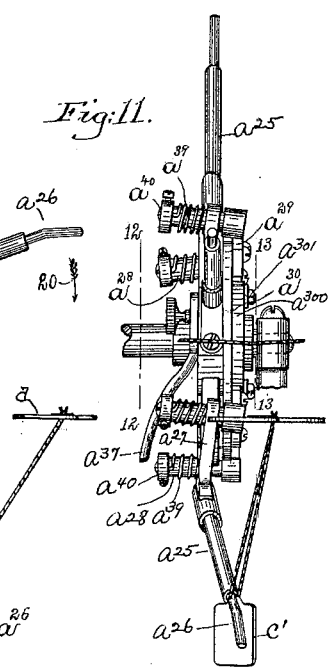
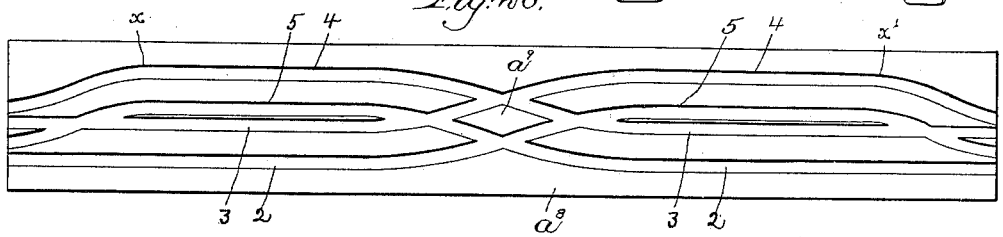
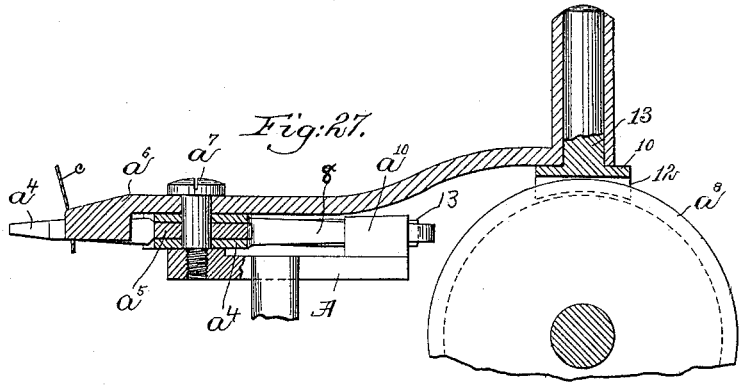
Witnesses.
Howard F. Eaton.
J. Murphy.
Inventor:
John P. Swift
By Jas. H. Churchill
Atty.

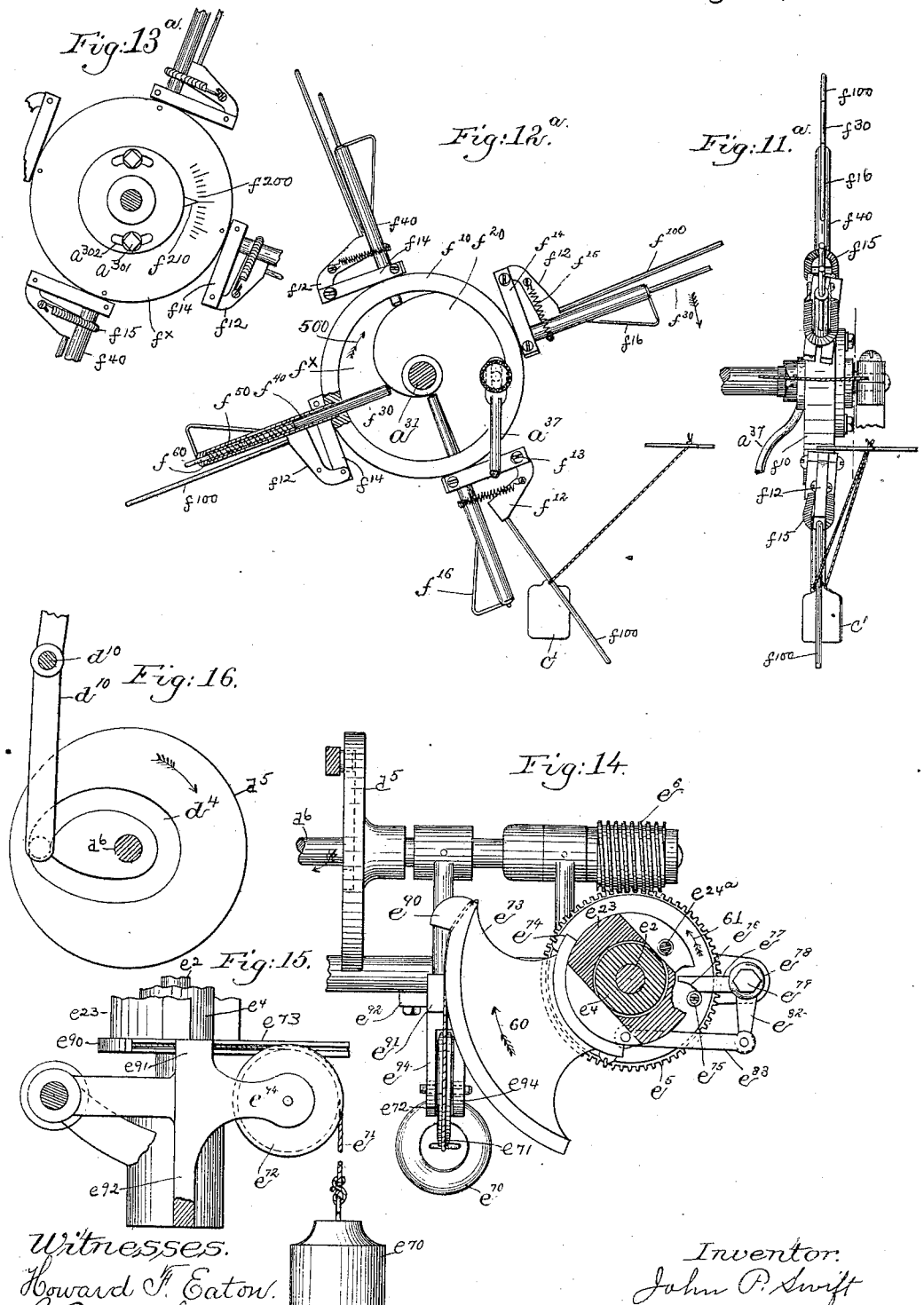

(No Model.) 9 Sheets—Sheet 7.
J. P. SWIFT.
TAG TYING AND BUNCHING MACHINE.
No. 566,353. Patented Aug. 25, 1896.
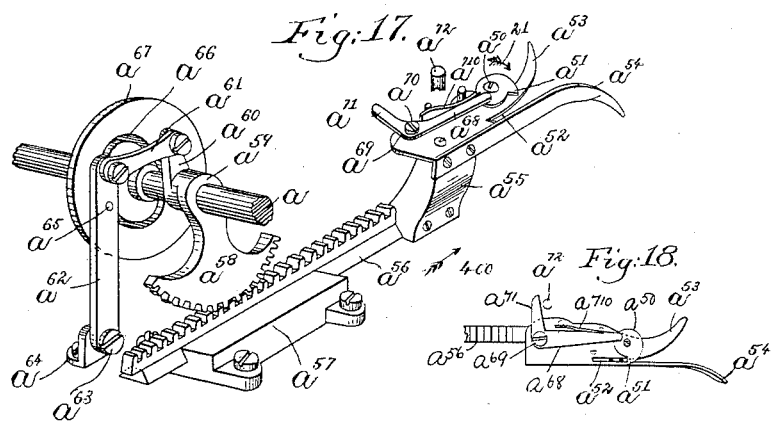
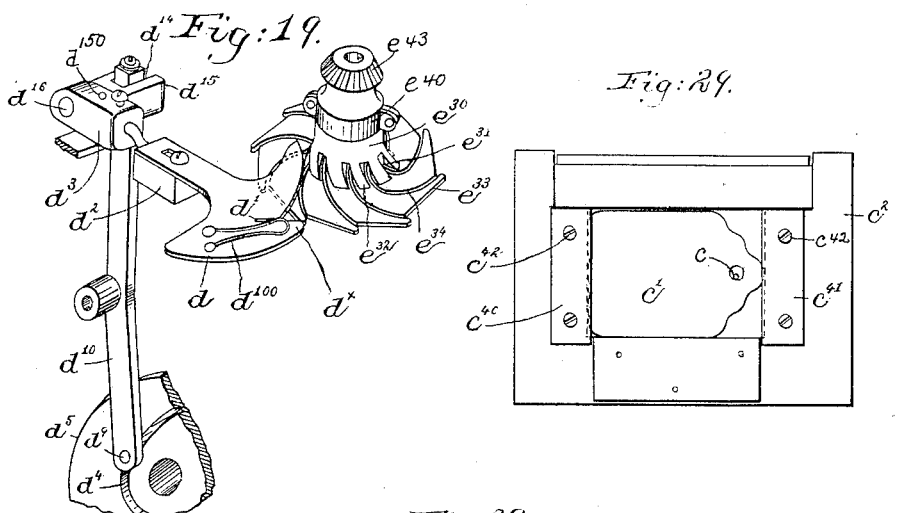
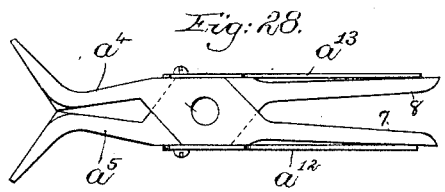
Witnesses.
Howard F. Eaton.
J. Murphy.
Inventor.
John P. Swift
By Jas. H. Churchill
Atty.

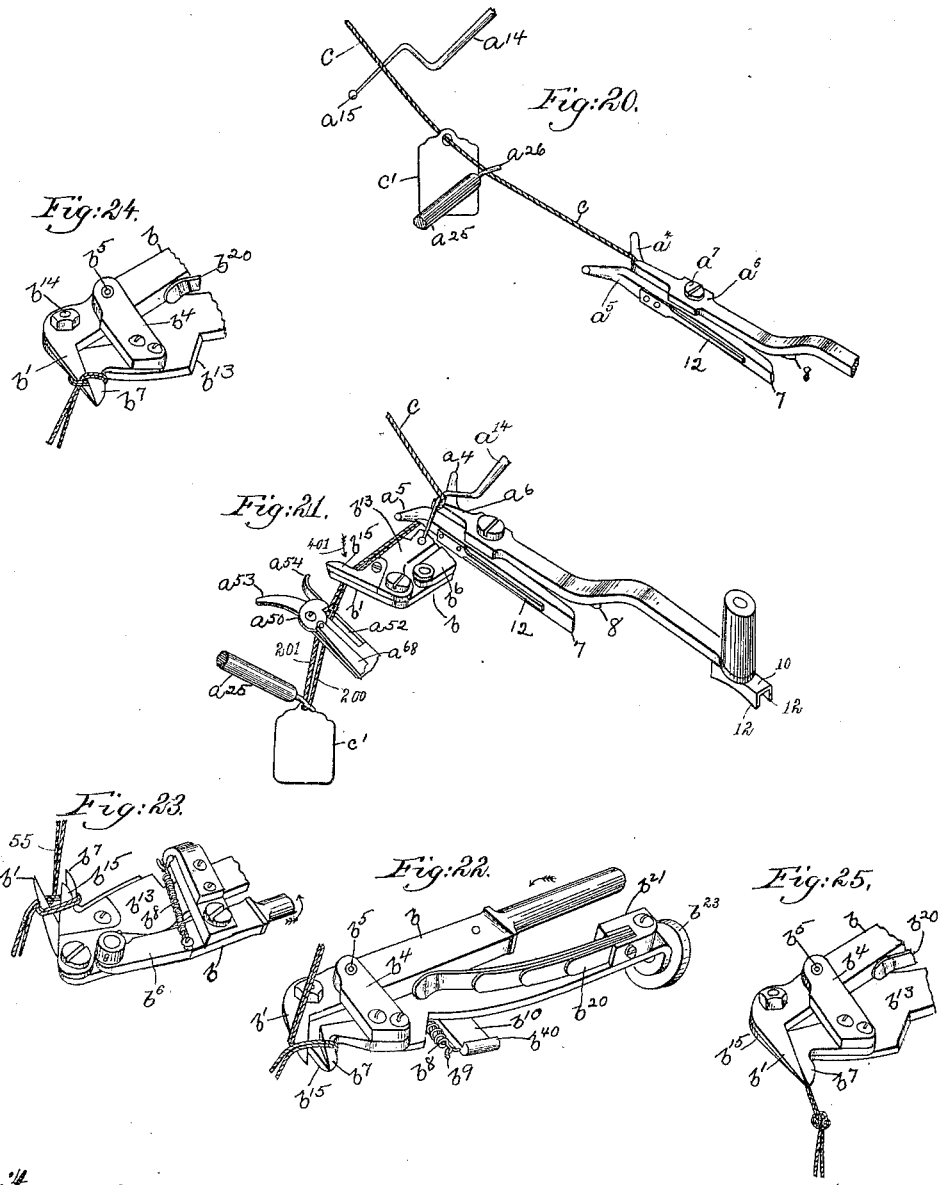

(No Model.)   9 Sheets—Sheet 9.

J. P. SWIFT.
TAG TYING AND BUNCHING MACHINE.

No. 566,353.   Patented Aug. 25, 1896.

Witnesses.
Howard F. Eaton.
J. Murphy.

Inventor:
John P. Swift
by Jas. F. Churchill
Atty.

UNITED STATES PATENT OFFICE.

JOHN P. SWIFT, OF BOSTON, MASSACHUSETTS.

TAG TYING AND BUNCHING MACHINE.

SPECIFICATION forming part of Letters Patent No. 566,353, dated August 25, 1896.

Application filed November 2, 1893. Serial No. 489,812. (No model.)

*To all whom it may concern:*

Be it known that I, JOHN P. SWIFT, residing in Boston, in the county of Suffolk and State of Massachusetts, have invented an Improvement in Tag Tying and Bunching Machines, of which the following description, in connection with the accompanying drawings, is a specification, like letters on the drawings representing like parts.

This invention relates to a novel method and apparatus for producing from a continuous string or cord knotted or tied loops, more particularly knotted or tied loops having tags or like blanks suspended thereon, and for the assembling or grouping the said knotted loops into predetermined numbers or bunches.

In accordance with this invention the tags are placed in or on a suitable holder, such, for instance, as a chute or receptacle, with their holes or eyelets registering with one another, and one end of the continuous twine, cord, or string is passed through the said eyelets and preferably placed in position to be engaged by a feeder, which carries the string into position to be engaged by grippers or holding-jaws, by which that portion of the string to be formed into a loop and upon which a tag is to be placed is rendered substantially taut, or, if desired, the end of the string may be placed by hand in the grippers. A tag is then withdrawn from its chute or receptacle and carried on the substantially taut string toward the grippers, after which the said string is carried downward to form one half or member of the loop, the other half or member of the loop being then formed by the feeder, which carries the string forward and into the open jaws of the grippers, as will be hereinafter described. The upper ends of the loop, which correspond to the loose ends of the hand-made loop, are then preferably severed from the string and mechanically tied into a knot, as will be described, and the tied or knotted loop is preferably conveyed to the assembling or what I prefer to designate as the "bunching" apparatus, wherein the tied tags are suspended and assembled or grouped in predetermined numbers to form what may be called a "bunch," as will be hereinafter set forth.

The apparatus by which the loops are formed and tied with the tags thereon and assembled is preferably made as will be described, and embraces novel combinations of parts, which will be hereinafter specified.

Figure 2:
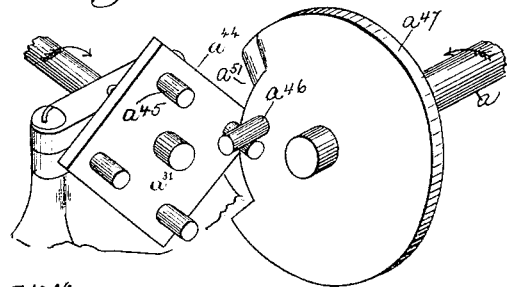
Figure 3:
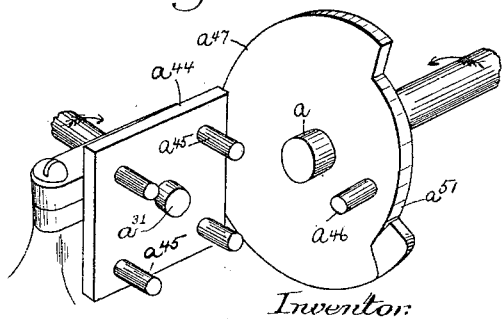
Figures 4, 5:
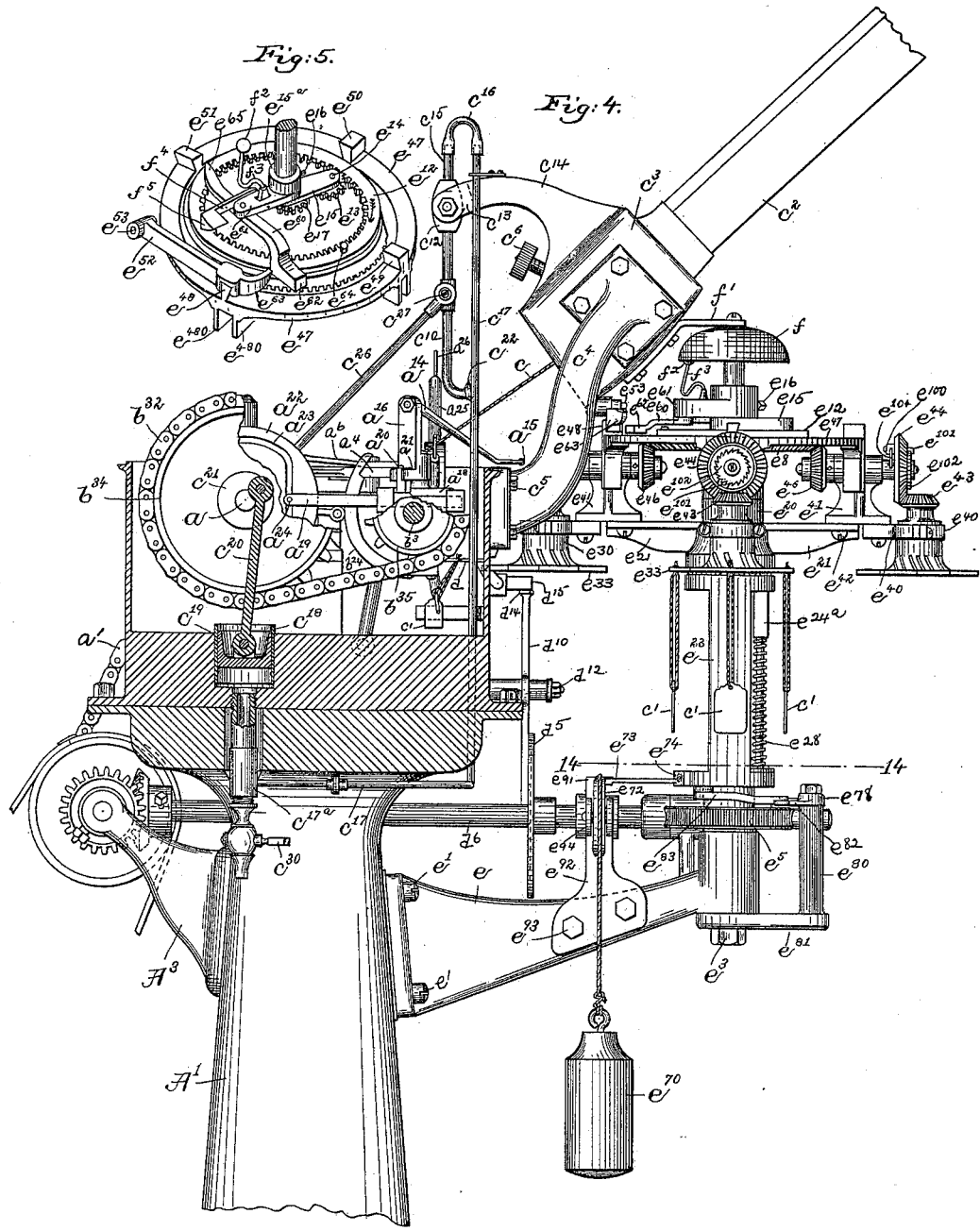
Figure 30:
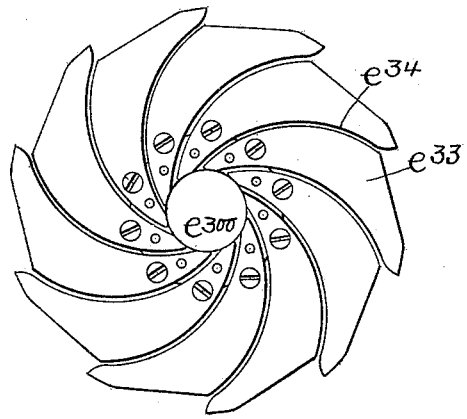
Figure 31:
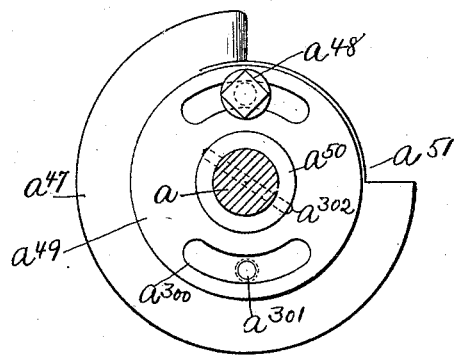
Figure 32:
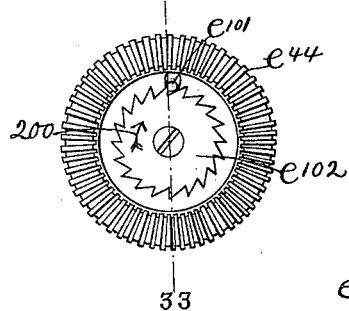
Figure 34:
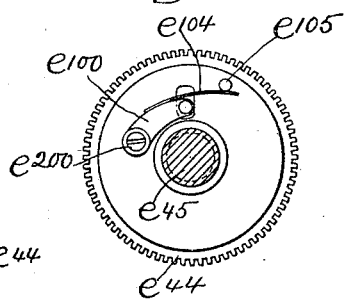
Figure 33:
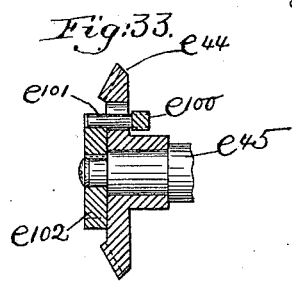

Figure 1 is a top or plan view of a tag forming and bunching apparatus embodying this invention, with parts of the apparatus omitted to enable the remaining parts to be more clearly shown; Figs. 2 and 3, details, on an enlarged scale, of mechanism for intermittently operating the looper, to be referred to; Fig. 4, a partial section and side elevation of the complete apparatus, the section being taken on the line 4 4, Fig. 1, and looking toward the left; Fig. 5, a detail in perspective to be referred to; Fig. 6, a vertical section of the apparatus shown in Fig. 1, the section being taken on the irregular line 6 6 and the "bunchers" being shown in elevation; Fig. 7, details in perspective to be referred to; Fig. 8, a detail, on an enlarged scale, of the knot-forming and loop-severing device preferred by me, together with the cam for operating the same; Fig. 9, a sectional detail, to be referred to, on the irregular line 9 9, Fig. 8; Fig. 10, a detail, on an enlarged scale, showing the knotter and loop-severing device in their closed position; Fig. 11, a detail in side elevation and on an enlarged scale of the form of loop-forming device preferred by me, showing one of the loopers engaged with the loop of a tied tag; Fig. 12, a sectional detail, on the line 12 12, Fig. 11, looking toward the right, to more clearly show the construction of the looper preferred by me; Fig. 13, a sectional detail, on the line 13 13, Fig. 11, to show a construction by which the length of the loop may be adjusted or regulated, as will be described; Figs. 11ª, 12ª, and 13ª, similar views of a modified form of loop-forming mechanism; Fig. 14, a sectional detail, on an enlarged scale, to be referred to, to show the mechanism by which the buncher-supporting frame is intermittently moved, the section being taken on the line 14 14, Fig. 4; Fig. 15, a detail to be referred to; Fig. 16, a detail, on an enlarged scale, of the cam for operating the tag-delivering device, to be referred to; Fig. 17, a detail in perspective and on an enlarged scale of the loop-holding device and its operating mechanism; Fig. 18, a detail in plan view showing the holder in its operative position; Fig. 19, a detail in perspective and on an enlarged scale showing the tag-delivering device in the position it would occupy when about to deliver its tag to the buncher; Fig. 20, a detail showing the gripping-jaws, the string, the string-carrier, and the looper in position they occupy when a loop is about to be formed; Fig. 21, a detail in perspective illustrating the parts shown in Fig. 20 in the position they occupy when the knot is about to be tied, and also showing the loop-holding device and the knotter shown in Fig. 10 in the position the latter occupies when about to form the knot; Fig. 22, a detail in perspective representing the knotter shown in Figs. 10 and 21 as turned through an arc of one hundred and eighty degrees and into the position shown in Fig. 8, the said figure also showing the two members or parts of the loop wound about the beak of the knotter; Fig. 23, a detail in perspective representing the knotter turned through an angle of forty-five degrees from the position shown in Fig. 22; Fig. 24, a detail in perspective showing the knotter in its closed position just preparatory to slipping the noose of the loop off from the knotter to form a knot in the loop; Fig. 25, a detail in perspective of the knotter, showing the noose of the loop as slipped off from its beak and formed into a knot, the knotter retaining hold of the free ends of the loop; Fig. 26, a developed view of a switch-cam for operating the intermediate jaw of the grippers; Fig. 27, a detail, on an enlarged scale, partly in section, to more clearly show the preferred form of construction of the gripping-jaws; Fig. 28, a detail in plan view of the gripping-jaws, with the intermediate jaw omitted; Fig. 29, an end view of the tag-containing chute, to more clearly show the manner of holding the tags within its chute; Fig. 30, an under side view, on an enlarged scale, of one of the bunchers; Fig. 31, a detail, on an enlarged scale, to more clearly show the manner of securing the disk $a^{47}$ to its shaft; Fig. 32, a front elevation, on an enlarged scale, of one of the buncher-driving gears; Fig. 33, a sectional detail on the line 33 33, Fig. 32; and Fig. 34 a rear elevation of the gear shown in Fig. 32.

The apparatus, as herein shown, comprises a loop-forming and tag-tying portion and a tag assembling or bunching portion constructed and arranged to coöperate, but to enable the invention to be more readily understood I prefer to specifically describe each portion separately in the order specified.

The operating parts of the loop-forming and tag-tying portion are supported in a suitable framework, which, in the present instance, is shown as a substantially oblong box or casing A, erected upon a standard or upright A'. (See Figs. 4 and 6.)

The framework A supports in suitable bearings a shaft $a$, (see Fig. 1,) which may be driven, as herein shown, from a shaft $A^2$ by suitable mechanism, herein shown as a sprocket-chain $a'$, passed about a sprocket-wheel $a^3$ on the shaft $a$ and about a sprocket-wheel $a^4$ on the shaft $A^2$, the latter shaft being supported in suitable arms $A^3$ $A^4$, secured to the upright or standard A'.

The shaft $a$ constitutes the main operating-shaft of the machine, upon which are secured various devices, such as cams and eccentrics, for producing movement of different mechanisms, as will be described.

The parts operated by the cams and eccentrics on the shaft $a$, as herein shown, and which will be hereinafter specifically described, are as follows: first, grippers or holding-jaws, which operate to hold fast one end of the string, cord, or twine; second, a feeder, which carries the string into the said jaws; third, a tag-carrier or feeder mechanism, which places a tag upon the string; fourth, a looper, which acts on the string held by the jaws and carries the same downward to form one half or member of the loop; fifth, a loop-holding device by which the two halves or members of the loop are held while a knot is being tied in the said loop; sixth, a knotting device by which the loop is severed from the string and tied, and, seventh, a brush by which the loose ends of the string retained by the grippers are removed from the said grippers.

The grippers or holding-jaws, which may and preferably will be made as herein shown, consist of two members $a^4$ $a^5$ (see Fig. 28) and an intermediate member $a^6$, all pivotally secured together by the screw $a^7$ (see Figs. 1 and 27) and forming a double set of holding-jaws or grippers, the intermediate jaw $a^6$ coöperating with the member or jaw $a^4$ to form one set and with the jaw or member $a^5$ to form the other set. The intermediate jaw $a^6$ is operated to coöperate first with one jaw, as, for instance, the jaw or member $a^4$, and then with the jaw or member $a^5$, as herein shown, by a two-path switch-cam $a^8$, (see Figs. 1 and 26,) fast on the shaft $a$ and provided, in the present instance, with four peripheral grooves or channels, (marked 2 3 4 5 in Fig. 26,) the said grooves forming two tracks or paths, which are made to cross and connect with each other by a switch $a^9$, for a purpose as will be described.

The members or jaws $a^4$ $a^5$ have their rear ends 7 8 extended to engage a stationary upright or stop $a^{10}$, which may form part of the framework A, and the said jaws are adapted to be brought into engagement with said stop, as herein shown, by flat springs $a^{12}$ $a^{13}$, secured to the said jaws, as best shown in Fig. 28, for a purpose as will be described.

The intermediate jaw $a^6$ of the grippers carries at its rear end a device for engaging the tracks or ways on the cam $a^8$, the said device, in the present instance, being represented in Figs. 21 and 27 as a follower consisting of a top piece 10 and depending side pieces 12, the latter fitting into grooves forming the track or way. The top piece 10 of the follower referred to is provided, as shown in Fig. 27, with a stud or upright projection 13, extended up into a tubular upright 14 on the rear end of the jaw $a^6$, the latter being brought into engagement with one jaw, as $a^4$, when the side pieces $a^{12}$ of the follower are in one track or set of grooves, as 2 3, and into engagement with the other jaw, as $a^5$, when the said side pieces of the follower are in the other track or set of grooves 4 5, for a purpose as will be described.

The grippers have coöperating with them a feeder for the string or twine, preferably made as herein shown, and consisting of an arm or rod $a^{14}$, provided at its free end with a bent finger $a^{15}$ (see Figs. 1 and 4) and secured in an upright $a^{16}$ of a movable frame or bracket, pivoted, as at $a^{17}$, to a stationary portion or support $a^{18}$, constituting a guideway for a sliding rod or bar $a^{19}$, (see Figs. 1 and 4,) operatively connected to the said movable bracket or frame, it being herein shown as provided with a square or other than round upright stud $a^{20}$, extended between a forked arm $a^{21}$ of the said movable frame. The sliding rod $a^{19}$ may be reciprocated, as herein represented, by a cam-disk $a^{22}$, fast on the shaft $a$ and having in one face a cam-groove $a^{23}$, (see Fig. 4,) into which projects a pin, roller, or stud $a^{24}$ on the sliding rod $a^{19}$. The cam-groove $a^{23}$ is shaped in suitable manner to intermittingly operate the slide-rod $a^{19}$, and thereby intermittingly oscillate the feeder $a^{14}$, so that after the said feeder has carried the string or cord to the gripping-jaws and has again returned to its normal or starting position (shown in Fig. 1) it will remain stationary while one half or member of the loop is being formed, after which the said feeder becomes active to again feed the string to the grippers to form the other half or member of the said loop, as will be hereinafter more fully described. After the string has been carried by the feeder $a^{14}$ to the gripping-jaws and has been firmly grasped between the intermediate jaw $a^6$ and one of the jaws $a^4$ $a^5$ the said string is acted upon by a looper, which forms one half or member of the completed loop upon which the tag is strung.

One form of looper by which this result may be accomplished is shown in Figs. 11 and 12, and another form of looper is shown in Figs. 11$^a$ and 12$^a$; but instead of the particular construction shown I may employ any other suitable construction of device capable of performing the work, but I prefer to employ the form of looper shown in Figs. 1, 11, and 12. As shown in Figs. 1, 11, and 12, the looper consists of an arm $a^{25}$, provided with a finger $a^{26}$, preferably slightly bent, the said arm being secured to or forming part of an elbow-lever $a^{27}$, loosely mounted on a stud or pivot $a^{28}$, extended from a lug or ear $a^{29}$, secured to or forming part of a disk $a^{30}$, rendered fast on a shaft $a^{31}$, having bearings in suitable uprights $a^{32}$ $a^{33}$, forming part of the framework. The disk $a^{30}$ may and preferably will be adjustably clamped or secured to a disk $a^{300}$, which is fast on the shaft $a^{31}$, the disk $a^{30}$ being secured to the disk $a^{300}$, as shown in Fig. 13, by screws or bolts $a^{301}$, extended through slots $a^{302}$ in the disk $a^{300}$.

The elbow-lever $a^{27}$ may be provided, as herein shown, with a shoe $a^{34}$, which coöperates with a cam $a^{35}$, loose on the shaft $a^{31}$, but held stationary by means of a thumb-screw $a^{36}$, (see Fig. 12,) inserted through the slotted end of an arm or bracket $a^{37}$, secured to a portion $a^{38}$ of the framework. The elbow-lever $a^{27}$ is adapted to be turned on its stud or pivot $a^{28}$ in one direction by the loop of the string or twine, as will be described, and is restored to its normal position, as herein shown, by means of a torsional spring $a^{39}$, encircling the stud or pivot $a^{28}$ and having one end fastened to the lever $a^{27}$ and its other end secured to a collar $a^{40}$, fast on the said stud. In the present instance the looper-carrying disk $a^{30}$ is shown as provided with four looper-arms, and as herein represented the said disk is provided with four circumferential lugs or projections $a^{41}$, between which are located the shoes $a^{34}$ of the different looper-levers $a^{27}$, each of the said lugs being provided, as shown, with a spring $a^{42}$, secured to it, as by a screw $a^{43}$, and which spring acts as a buffer to relieve the force of the blow of the looper-lever $a^{27}$ against the lug $a^{41}$ when the said looper-lever is restored to its normal position by the spring $a^{39}$. The looper-carrying shaft $a^{31}$ is intermittingly turned or rotated, which may and preferably will be accomplished by a mechanism shown separately in Figs. 2 and 3, and consisting of a square or other than round disk or plate $a^{44}$, fast on the looper-shaft $a^{31}$, and provided, as herein shown, with studs $a^{45}$, corresponding in number to the looper-arms carried by the disk $a^{30}$, which number in the present instance is four. The studs $a^{45}$ have coöperating with them a stud or projection $a^{46}$ on a disk $a^{47}$, the latter being rendered fast on the shaft $a$, which may be effected in any suitable manner, as by means of threaded bolts $a^{48}$, extended through slots $a^{300}$ in the flange $a^{49}$ of a hub $a^{50}$, secured on the said shaft, as by the pin $a^{302}$, (see Figs. 1 and 31,) the said threaded bolts entering suitable threaded sockets $a^{301}$ in the disk $a^{47}$. In this manner the disk $a^{47}$ is adjustably and removably secured on the shaft $a$. The disk $a^{47}$, as shown, is provided at its circumference with a cut-away portion $a^{51}$ of sufficient size or length to afford a passage-way for a corner of the plate $a^{44}$, and to permit the said plate and the looper-carrying shaft to be partially rotated by the stud $a^{46}$, engaging one of the studs or projections $a^{45}$, and as soon as the stud $a^{46}$ has passed by or out of engagement with a stud $a^{45}$, the disk or plate $a^{44}$ and the looper-shaft $a^{31}$ will be locked against rotation by means of the disk $a^{47}$, one side of the plate $a^{44}$ being at such time in engagement with the disk $a^{47}$, as represented in Fig. 3, and remaining in engagement therewith until the stud $a^{46}$ engages another stud $a^{45}$, at which time the cut-away portion $a^{51}$ of the disk $a^{47}$ will be in position to afford a passage for the corner of the disk $a^{44}$ and permit it to be turned.

In the present instance it will be seen from an inspection of Figs. 2 and 3 that the looper-shaft $a^{31}$ is given a quarter-turn by each complete revolution of the shaft $a$, and during substantially the larger part of the revolution of the shaft $a$ the looper-carrying shaft $a^{31}$ is locked against rotation. At each quarter-rotation of the looper-shaft $a^{31}$ a looper-arm $a^{25}$ is moved downward in the direction indicated by arrow 20, Fig. 12, and carries the string held by the grippers in a downward direction to form one member or half 200 of the loop, the other member or half, 201, of which (see Fig. 21) is then formed by the feeder-arm $a^{14}$ carrying the twine or string $c$ to the grippers and bringing the two members or halves of the loop substantially close together preparatory to forming the knot; and when the two halves or members of the loop are brought substantially close together, as described, they are engaged by a locking or holding device, which serves to retain the two members of the loop in position to be engaged by the knotter, as will be hereinafter described.

The loop locking or holding device may and preferably will be made as herein shown, it consisting, essentially, (see Figs. 17 and 18,) of a disk $a^{50}$, provided with a finger or projection $a^{51}$, adapted to be brought over and close a passage-way $a^{52}$, formed, as herein shown, by two plates or guide-bars $a^{53}$ $a^{54}$, secured, respectively, to the top and side of a post or upright $a^{55}$, attached to a rack-bar $a^{56}$, the latter being adapted to move in a suitable guideway $a^{57}$, fastened to a stationary portion of the machine. The rack-bar $a^{56}$ may be reciprocated by means of a segmental gear $a^{58}$, secured to or forming part of a hub $a^{59}$, mounted loosely on the shaft $a$ and provided with a crank-arm $a^{60}$, joined by a connecting-rod $a^{61}$ to a lever $a^{62}$, pivoted, as at $a^{63}$, to a bracket $a^{64}$, secured to or forming part of the framework of the machine, the said lever being provided with a stud or projection $a^{65}$, extended into a cam-groove $a^{66}$ in one face of a cam-disk $a^{67}$, fast on the shaft $a$. The disk $a^{50}$, as herein shown, is pivotally mounted on the plate or bar $a^{53}$, and has pivotally connected to it one arm $a^{68}$ of an elbow-lever $a^{69}$, pivoted to the plate or bar $a^{53}$, as at $a^{70}$, and having its other arm, $a^{71}$, adapted to be brought into engagement with a stud or post $a^{72}$, erected from a stationary portion of the machine, the said post or stud turning the elbow-lever $a^{69}$, so as to move the disk $a^{50}$ in the direction of arrow 21, and bring its nose or projection $a^{51}$ across the slot $a^{52}$ and behind the members of the loop, as clearly represented in Fig. 18. The two members of the loop are now in condition to be tied or knotted, which may be effected by means of a knotting device, preferably of a construction as will now be described, and which is best shown in Figs. 8, 10, and 22 to 25 inclusive. The knotting device herein shown comprises two parts or members, one of which is preferably fixed and is herein shown as a bar $b$, provided at its front end with a pointed extension or nose $b'$, the said bar at its rear end, as herein shown, (see Fig. 8,) being made cylindrical in form and extended into a suitable socket in an enlarged portion $b^2$ of a shaft $b^3$, by which the knotter may be revolved. The fixed member or bar $b$ has coöperating with it a second or movable member herein shown as an elbow-lever $b^4$, fast on a pivot or rock-shaft $b^5$, extended through the bar $b$, and having secured to it on the opposite side of the bar $b$ (see Fig. 10) a crank or arm $b^6$, the elbow-lever $b^4$ being provided with a pointed extension or nose-piece $b^7$, which coöperates with the pointed extension or nose-piece $b'$ of the bar $b$ to form the nippers or holding-jaws of the knotting device.

The movable jaw or nipper $b^7$ may be normally brought in close contact with the fixed jaw $b'$, as herein shown, by means of a spring $b^8$, having one end secured to the crank or arm $b^6$, and having its other end fastened, as herein shown, to a hook $b^9$, projecting from a bar $b^{10}$, fastened, as by screw $b^{12}$, to the bar $b$.

The jaw $b^7$ is adapted to be moved away from the jaw $b'$, which may be accomplished, as herein shown, by means of a lever $b^{13}$, pivoted to the fixed member $b$, as at $b^{14}$, and provided at its front end with a shearing extension or nose-piece $b^{15}$, constituting a knife-blade, which coöperates with the jaws $b'$ $b^7$ to sever the cord or twine held therein, as will be described. The knife-blade $b^{15}$ may form an integral part of the lever $b^{13}$, or it may be a separate piece and be attached thereto, as by a screw $b^{16}$. (See Fig. 10.) The lever $b^{13}$ may be turned on its pivot to produce a cutting action of the knife $b^{15}$ by a spring $b^{20}$, herein shown as a laminated spring secured to a suitable holder $b^{21}$, fastened to the lever $b^{13}$. The lever $b^{13}$ may be provided at its rear end, as shown, with a roller $b^{23}$, which coöperates with a cam $b^{24}$, fastened to a rod $b^{25}$, pivotally connected, as at $b^{26}$, to a stationary portion of the machine, the cam $b^{24}$ being provided with an enlarged portion $b^{27}$, for a purpose as will be described.

The cam $b^{24}$ has pivotally connected to it, as at $b^{28}$, a rod or arm $b^{29}$, secured to a strap $b^{30}$ of an eccentric $b^{31}$, mounted on the shaft $a$. The shaft $b^3$, to which the fixed member $b$ of the knotter is secured, may be supported in suitable uprights 30 31, secured to or forming part of the framework of the machine, and may be rotated from the shaft $a$, as herein shown, by means of a sprocket-chain $b^{32}$, passed about sprocket-wheels $b^{34}$ $b^{35}$ on the shafts $a$ and $b^3$, respectively, and best shown in Fig. 4, but it is evident that the shaft $b^3$ may be connected to the shaft $a$ by gears. The cam $b^{24}$ operates upon the roller $b^{23}$ to turn the lever $b^{13}$ on its pivot, so as to move its knife $b^{15}$ away from the stationary jaw $b'$ of the nippers. At the same time the lever $b^{13}$ engages the crank or arm $b^6$ and moves it in the direction indicated by arrow 22, Fig. 10, against the action of its spring $b^8$, thereby turning the shaft or pivot $b^5$ and its attached elbow-lever $b^4$ in such direction as to move the jaw $b^7$ away from the jaw $b'$ and into substantially the position shown in Fig. 8, in which condition the jaws are capable of receiving between them the two members of the loop, as will be described.

The portion $b^{27}$ of the cam $b^{24}$ permits the lever $b^{13}$ to be moved by its spring $b^{20}$, in the direction indicated by arrow 23 in Fig. 10, a sufficient distance to remove the lever $b^{13}$ from engagement with the crank or arm $b^6$, thereby permitting the latter to be moved by its retracting-spring $b^8$ in the direction indicated by arrow 23 in Fig. 10, thus turning the shaft or pivot $b^5$ in such direction as to bring the movable jaw $b^7$ toward and into engagement with the fixed jaw $b'$, thereby firmly clamping the two members of the loop, preparatory to severing the same from the string by the knife $b^{15}$, which is brought into action by the spring $b^{20}$ when the roller $b^{23}$ is removed from engagement with the cam $b^{24}$ and its enlarged portion $b^{27}$, the movement of the lever $b^{13}$, when freed from the cam $b^{24}$ and the portion $b^{27}$, being limited by a stop, shown as an overturned edge $b^{40}$ on the bar $b^{10}$.

The jaws $b'$ $b^7$ are preferably made substantially flat on one side and are rounded on the other side, and the cutting-blade or shear $b^{15}$ is made flat on one side and rounded on the other side.

The flat side of the cutting-blade $b^{15}$ is contiguous to the flat sides of the jaws $b'$ $b^7$, so that when the jaws $b'$ $b^7$ are closed and the cutting-blade is in its normal or inoperative position (shown in Fig. 10) the rounded sides of the said blade and jaws form a substantially conical beak or horn over which the noose of the loop is drawn to form the knot.

It will be understood from the above description of the apparatus that a continuous or substantially long string or twine $c$ is employed, and that the tags $c'$ are made prior to being placed in the machine, and are and may be of any suitable form such as now commonly suspended by a loop of non-metallic fibrous material.

The tags $c'$ are provided with eyelets or holes through which the string is passed, and the said tags are placed in or on a suitable holder or support, herein shown as a chute, guideway, or receptacle $c^2$, which is herein represented in Figs. 4 and 6 as a substantially long rectangular tube extended through a hollow support, represented as a box $c^3$, sustained in an inclined position by means of arms $c^4$, attached to the rear side of the framework, as by bolts or screws $c^5$.

The tag-containing chute or guideway $c^2$ may be removably secured in the box $c^3$, as by a screw $c^6$. The tags $c'$ are arranged within the chute or guideway $c^2$ with their eyelets or holes in line with one another, so that the string or twine $c$ may be passed through the eyelets or holes of all the tags contained in the said chute.

The string or twine $c$ may be taken from a ball, spool, or bobbin, not herein shown, but which may be suitably supported above the top of the chute $c^2$ and preferably substantially in line with the same; but while this arrangement is preferred, as it leaves the string free and does not offer any resistance or drag to the feeder $a^{14}$, I do not desire to limit my invention to any particular location of the string outside of the machine, nor to any particular form in which the string is assembled, as it may be left in a loose state. When the string $c$ has been fed to the grippers, as above described, that portion of the string between the grippers and the mouth of the chute $c^2$ is inclined and substantially straight, as represented in Figs. 4 and 6.

The tag $c'$ nearest the mouth or discharge end of the chute $c^2$ is removed from the said chute and carried down on the substantially straight portion of the string toward the grippers, and I prefer to remove the tag just prior to the action of the looper. The tags $c'$ are removed from the chute $c^2$ by a tag-feeding mechanism, which may and preferably will be of the construction herein shown, it consisting of a suction device composed of a pipe $c^{10}$, mounted to swing in the arc of a circle, the said pipe being herein shown (see Figs. 4 and 6) as secured to or forming part of a hollow fitting $c^{12}$, pivotally mounted in forks $c^{13}$ of an arm $c^{14}$, secured to or forming part of the box $c^3$. The fitting $c^{12}$ is connected, as shown, by pipes $c^{15}$ $c^{16}$ to a pipe $c^{17}$, connected, as herein shown, to an enlarged pipe $c^{17a}$, communicating with the cylinder $c^{18}$ of an air or vacuum pump, and in which is reciprocated a piston $c^{19}$, having its piston-rod $c^{20}$ eccentrically connected to the hub $c^{21}$ of the sprocket-wheel $b^{34}$ on the shaft $a$.

The pipe $c^{16}$ may be made of rubber or other flexible material to permit of the pivotal movement of the pipe $c^{10}$, the latter for the best results being provided with a rubber or other flexible tip or nozzle $c^{22}$ to obtain a superior holding effect on the tag with which it is brought in contact. The pipe $c^{10}$ may be oscillated toward and from the tag chute or guideway $c^2$, as herein shown, by an eccentric $c^{24}$, fast on the shaft $a$ and having its strap $c^{25}$ connected by a rod $c^{26}$ to a stud or support $c^{27}$, extended from the pipe $c^{10}$. The pipe $c^{17a}$ is provided, as shown, with a cock or valve $c^{30}$, by opening which the vacuum in the cylinder $c^{18}$ and in the pipes $c^{17}$ $c^{16}$ $c^{10}$ may be destroyed, if at any time it is found desirable so to do. The tags $c$ in the chute or guideway $c^2$ are preferably acted upon by a weight $c^{31}$, represented in Fig. 6 as a block having a slot or opening $c^{31a}$ in its under side, and in which is pivoted a pawl $c^{32}$, coöperating with a ratchet-bar $c^{33}$, supported upon the bottom of the chute or guideway and extended substantially the length of the same, the said pawl being kept in engagement with the said ratchet-bar, as herein shown, by a spring $c^{34}$, carried by the said block or weight. The weight $c^{31}$ forces the tags down toward the discharge end or mouth of the chute $c^2$ with sufficient pressure to insure the tags being in proper position to be acted upon by the tip or nozzle $c^{22}$. The chute or guideway $c^2$ is preferably provided with side ledges, acting as rests or stops, against which bear the ends of the tag nearest the discharge-mouth of the said chute, the said ledges or stops being formed, as herein shown, by pieces or bars $c^{40}$ $c^{41}$, secured to the chute $c^2$, as by screws $c^{42}$. (See Figs. 6 and 29.)

The weight or block $c^{31}$, by reason of the pawl $c^{32}$ being in engagement with the ratchet-bar $c^{33}$, keeps the tags between the said weight and the rests or stops $c^{40}$ $c^{41}$ substantially solid or compact, and the said tags are prevented from yielding to the impact of the nozzle $c^{22}$ on the pipe $c^{10}$ when the said nozzle is brought in contact with the endmost tag in position to be removed from the chute. By means of the pawl engaging the ratchet-bar $c^{33}$ the block $c^{31}$ may be made substantially light but yet of sufficient weight to gently force the tags down the chute against the rests $c^{40}$ $c^{41}$, the said tags being held by the pawl $c^{32}$, as described, so as to offer a sufficient resistance to the flexible nozzle $c^{22}$ to cause the latter to be pressed against the endmost tag with sufficient force to fix the rubber nozzle against the tag air-tight, so that when the pipe $c^{10}$ is moved backward away from the chute $c^2$ the tag fixed by the vacuum to the nozzle $c^{22}$ will be carried by the said pipe out of the chute and down on the substantially straight portion of the string toward the grippers. The lightness of the weight $c^{31}$ prevents the endmost tag being jammed or forced against the side bars or stops $c^{40}$ $c^{41}$ with such pressure as would not permit the vacuum to pull the tag out of the chute.

The tag carried by the nozzle $c^{22}$ may be freed therefrom by destroying the vacuum in the cylinder $c^{18}$, which may be effected by providing the said cylinder with an air-inlet, not herein shown, but which is uncovered by the piston $c^{19}$ when the latter reaches approximately the limit of its upward stroke. After the tag is freed from the nozzle $c^{22}$, a loop is formed and knotted or tied by the mechanisms above referred to, and the operation of which will be more fully and connectedly described hereinafter. The completed loop with its attached tag may then be carried forward by a delivering device, which carries it to the assembling or bunching portion of the apparatus, as will be described, the said device in the present instance being shown as a segmental arm or plate $d$, provided with a slit $d'$ and secured to the arm $d^2$ (see Figs. 1 and 19) of a lever $d^3$, pivotally secured, as at $d^{150}$, to the framework of the machine to swing in a substantially horizontal path, the said lever, as herein shown, being oscillated by means of a cam-groove $d^4$ in a disk $d^5$, mounted on a shaft $d^6$, extended substantially at right angles to the shaft $a$ and operatively connected to the main shaft $A^2$ by means of a bevel-pinion $d^7$ on the shaft $d^6$, meshing with a bevel-pinion $d^8$ on the shaft $A^2$.

The cam-groove $d^4$ of the disk $d^5$ has extended into it a stud or roller $d^9$ on one end of a lever $d^{10}$, pivoted, as at $d^{12}$, (see Fig. 6,) to a stationary portion of the machine, and having its upper end, as herein shown, provided with a square or other than round collar $d^{14}$, fitted loosely on the end of the said lever and extended into a forked arm $d^{15}$, pivotally secured, as at $d^{16}$, to the lever $d^3$. By an inspection of Figs. 6 and 19 it will be seen that as the lever $d^{10}$ is oscillated in a substantially vertical plane the lever $d^3$ will be oscillated in a substantially horizontal plane and will act to carry the completed loop with its suspended tag from the position shown in Fig. 1 to that shown in Fig. 19, in which latter position the completed loop will be in position to be taken out of the slot $d'$ of the delivering device $d$.

The shaft $a$ adjacent to the cam-hub $a^8$ has fast on it a pulley $d^{20}$, connected by a band or belt $d^{21}$ to a pulley $d^{22}$, secured to or forming part of a sleeve $d^{23}$, (see Fig. 1,) to which is fastened a circular brush $d^{24}$, (see Fig. 6,) the purpose of which will be hereinafter described. The sleeve $d^{24}$ is loosely mounted on a stud or rod $d^{25}$ near the outer end of an arm $d^{26}$ of a hub $d^{27}$, (see dotted lines, Fig. 6,) the said hub being loose on the shaft $a$ and provided with a crank or arm $d^{28}$, joined by a link $d^{29}$ to a lever $d^{30}$, pivoted, as at $d^{31}$, to a stationary part of the machine and provided with a pin or projection $d^{32}$, extended into a cam-groove $d^{33}$ in one face of the pulley $d^{20}$. The cam-groove $d^{33}$ is of suitable shape to turn the hub $d^{27}$ on the shaft $a$, through the lever $d^{30}$, link $d^{29}$, and crank $d^{28}$, so as to raise the outer end of the arm $d^{26}$ and bring the rotary brush $d^{24}$ underneath the grippers, whereby the surplus portions of the loop retained by the grippers after the loop has been severed from the string may be removed from the said grippers. In order that the loop may be brought nearer the knotter when one member of the loop is firmly grasped between the jaws $a^6$ $a^5$, the grooves or tracks 4 5 are preferably brought nearer the grooves or tracks 2 3 for a portion of their length, as from the point X to the point X' in Fig. 26. This construction insures the engagement of the beak of the knotter with the members 200 201 of the loop, as shown in Fig. 21.

I have thus far described an apparatus in which a loop of string or twine is formed from a continuous string and tied with a tag suspended therefrom, and I will now proceed to the description of an apparatus in which the tied or knotted loops and their attached tags may be assembled in predetermined numbers or bunches, and which apparatus I prefer to hereinafter refer to as the "bunching" apparatus, which may and preferably will be constructed substantially as follows: An arm $e$, secured to the standard or upright A' of the machine, as by bolts or screws $e'$, (see Fig. 4,) is cored to receive an upright rod or spindle $e^2$, the portion of the spindle above the arm $e$ being shown as of larger diameter and resting upon the upper surface of the said arm. The spindle $e^2$ is rendered fast to the arm $e$, as herein shown, by a nut $e^3$. On the spindle or rod $e^2$ is loosely mounted a sleeve $e^4$, which is fastened in any suitable manner at its lower end to the hub of a worm-gear $e^5$, driven by a worm $e^6$ on the shaft $d^6$. The worm $e^6$ may and preferably will be what is known as a "triple thread," so as to produce the desired rate of movement of the worm-gear $e^5$, for a purpose as will be described.

The sleeve $e^4$ has fitted upon it at its upper end a cap $e^7$, which is secured to said sleeve to revolve therewith and which cap practically forms the hub of a gear $e^8$, beveled on its under side for a purpose as will be described, the said gear being herein represented as fastened to the cap or hub $e^7$ by the screws $e^9$. (See Fig. 6.) The worm-gear $e^5$ in the present instance is provided with one hundred teeth and the beveled gear $e^8$ is also provided with one hundred teeth. The beveled gear $e^8$ is provided in its upper surface with an annular groove $e^{10}$, into which is loosely fitted an internally-geared ring $e^{12}$, with which meshes a pinion $e^{13}$, (see Figs. 1 and 5,) loose on a stud $e^{14}$, carried by an arm $e^{15}$ on a hub $e^{15a}$, fast on the spindle $e^2$, the said hub being secured to the spindle, as herein shown, (see Figs. 1 and 5,) by the set-screw $e^{16}$. The loose pinion $e^{13}$ meshes with a pinion $e^{17}$, attached to the upper side of the bevel-gear $e^8$, it being shown in Fig. 6 as secured to the said gear by screws $e^{18}$. The worm $e^6$ drives the worm-gear $e^5$, which in turn rotates the sleeve $e^4$ and the bevel-gear $e^8$, connected therewith, and the pinion $e^{17}$, fast on the upper surface of the bevel-gear $e^8$, drives the loose pinion $e^{13}$, which in turn drives the internally-geared ring $e^{12}$. The sleeve $e^4$ has loosely mounted upon it a hub $e^{20}$, provided with arms $e^{21}$, herein shown as four in number and forming one form of buncher-supporting frame, the said frame being mounted preferably upon an antifriction-bearing, shown as balls $e^{22}$, (see Fig. 6,) supported in an annular groove on the upper surface of a second sleeve or spool $e^{23}$, (shown best in Fig. 4,) and which for convenience in construction is herein shown as reduced in diameter or cut away at two diametrically opposite points or sides, and which carries a substantially vertical pawl $e^{24}$ on a rod $e^{24a}$ and coöperating with a ratchet collar or ring $e^{25}$, (shown best in Fig. 7,) the said ring or collar being fastened to the under side of the revolving buncher-carrying frame $e^{20}$, as by pins or screws $e^{26}$. (See Fig. 6.) The ratchet-ring $e^{25}$ and pawl $e^{24}$ constitute one form of clutch mechanism, for a purpose as will be described.

In the present instance the ratchet-ring $e^{25}$ is provided on its under side or edge with four teeth or notches $e^{27}$, (see Fig. 7,) corresponding to the number of arms $e^{21}$ on the buncher-supporting frame and into one of which the pawl $e^{24}$ is normally extended, as herein shown, by a spiral spring $e^{28}$, encircling the lower part of the pawl-carrying bar or rod $e^{24a}$, one end of the said spring bearing against the upper portion or head of the said pawl-carrying bar or rod and its other end resting upon the lower flange or head of the sleeve or spool $e^{23}$. The lower end of the pawl-carrying bar $e^{24a}$ is extended loosely into a hole or opening in the lower flange or head of the spool or sleeve $e^{23}$ to permit the said rod to rise and fall, as will be described.

Each arm $e^{21}$ of the hub $e^{20}$ carries a movable "buncher," which may and preferably will be made as herein shown, it consisting of a body portion $e^{30}$, (see Fig. 19,) made hollow at its center and provided with a series of curved slots or channels $e^{31}$, forming arms $e^{32}$, to the bottom of each of which is secured or forms part thereof a horizontally-extended curved finger $e^{33}$, forming, practically, an extension of the said arm, the said fingers forming curved slots or guideways $e^{34}$, which coincide with or form part of the slots $e^{31}$ and which meet at the center of the body $e^{30}$ and merge into or communicate with a central opening $e^{300}$ for a purpose as will be described. Each buncher may be removably secured to its carrying-arm $e^{21}$, as herein shown, by a collar or clamping-arms attached to a lug or projecting piece $e^{40}$, (see Fig. 4,) secured to an upright or standard $e^{41}$, fastened to the arm $e^{21}$, as by screw $e^{42}$.

Each buncher referred to may be provided, as shown, with a bevel-pinion $e^{43}$ in mesh with a bevel gear or pinion $e^{44}$, preferably loose on a shaft $e^{45}$, having bearings in the upright or standard $e^{41}$ and provided with a bevel-pinion $e^{46}$, which meshes with and is driven by the bevel-gear $e^8$. The standards or uprights $e^{41}$ support a ring $e^{47}$, (see Figs. 4, 5, and 6,) which may be fastened to the standards or uprights by depending lugs or ears $e^{480}$, adapted to be slipped down over the upper end of the said uprights so as to embrace the same, and, if desired, the said lugs or ears and uprights may be screwed or pinned together.

The ring $e^{47}$ is provided on its upper surface, as shown, with four studs or projections $e^{48}$ $e^{49}$ $e^{50}$ $e^{51}$, (see Fig. 5,) corresponding to the number of bunchers in the machine and which are engaged successively by a latch or locking mechanism, herein shown as a lever $e^{52}$, (see Fig. 5,) pivoted at one end to a stationary portion of the machine, it being herein shown as pivoted at $e^{53}$ to the bottom of the box $c^3$. (See Fig. 6.) The latch $e^{52}$ is provided, as shown, with a slot or opening on its under side, into which successively project the lugs on the ring $e^{47}$ and by which the said ring, the uprights $e^{41}$, the arms $e^{21}$, and hub $e^{20}$ are rendered temporarily stationary while a buncher is being filled, as will be described.

The latch or locking-lever $e^{52}$ may be released from that stud on the ring $e^{47}$ with which it is engaged while one buncher is being filled with tags by a disengaging or releasing device, which may be made as herein shown, (see Fig. 5,) it consisting of a lever $e^{60}$, loosely suspended near its center to the under side of an arm $e^{61}$ on the hub $e^{15a}$.

The lever $e^{60}$ is made of such length and shape that one arm $e^{62}$ may be brought under a finger $e^{63}$ on the latch or locking-lever $e^{52}$ by a stud or projection $e^{64}$ on the upper face of the internally-geared ring $e^{12}$ striking against the other arm or end $e^{65}$ of the releasing-lever $e^{60}$.

Referring to Fig. 5, it will be seen that as the internally-geared ring $e^{12}$ is moved in the direction indicated by the arrow thereon the stud $e^{64}$ will be brought against the arm $e^{65}$ on the lever $e^{60}$ and will move the arm $e^{62}$ of the said lever under the finger $e^{63}$ of the locking-lever $e^{52}$, the said finger, in the present instance, being cam-shaped or upwardly inclined on its under side, so that as the arm $e^{62}$ of the releasing-lever $e^{60}$ is moved under it the said finger will be raised and the lever $e^{52}$ will be disengaged from the said stud on the ring $e^{47}$, with which it is in engagement, and which stud in Fig. 5 is shown as $e^{48}$. As soon as the locking-lever $e^{52}$ is disengaged from the stud $e^{48}$ the ring $e^{47}$, the standards $e^{41}$, connected therewith, the arms $e^{21}$, and hub $e^{20}$ of the buncher-supporting frame are disconnected from the stationary framework of the machine, but held stationary for a substantially short time by the arm $e^{62}$ of the lever $e^{60}$, until the pin or stud $e^{64}$ passes by the arm $e^{65}$ of the lever $e^{60}$, after which the buncher-supporting frame is free to be moved or rotated, which is accomplished in the present instance by a mechanism, as will now be described, which imparts substantially a quarter-revolution to the parts enumerated or until the next stud on the ring $e^{47}$, which may be supposed to be the stud $e^{51}$, is engaged with the locking-lever $e^{52}$.

The mechanism by which the buncher-supporting frame and the parts sustained by it are rotated substantially a quarter-turn is shown in the present instance as a weight $e^{70}$, (see Figs. 4 and 14,) sustained by a cord $e^{71}$, passed over a pulley $e^{72}$ and secured to a segmental-shaped arm $e^{73}$, fastened, as by screw $e^{74}$, to the lower portion or head of the spool or sleeve $e^{23}$. The spool or sleeve $e^{23}$ and its attached segmental arm $e^{73}$ are given, preferably, less than a quarter turn or revolution in the direction indicated by arrow 60, Fig. 14, to lift the weight $e^{70}$, by means of a stud or projection $e^{75}$ on the upper surface of the worm-gear $e^5$, the said stud or projection being adapted to engage the preferably-curved end $e^{76}$ of one arm $e^{77}$ of an elbow-lever $e^{78}$, pivoted, as at $e^{79}$, to a post or upright $e^{80}$, secured to or forming part of a plate or bar $e^{81}$, herein shown as clamped to the supporting-arm $e$ by the nut $e^3$, the elbow-lever $e^{78}$ having its other arm $e^{82}$ connected by a link $e^{83}$ to the under side of the sleeve $e^{23}$.

From an inspection of Fig. 14 it will be seen that as the worm-gear $e^5$ is revolved by the worm $e^6$ in the direction indicated by arrow 61 the stud $e^{75}$ will engage the curved or inclined end $e^{76}$ of the arm $e^{77}$ and will turn the elbow-lever $e^{78}$, so as to move the sleeve $e^{23}$ and its attached segmental arm $e^{73}$ in the direction indicated by arrow 60, until the stud $e^{75}$, in the travel of the worm-gear $e^5$, pushes the arm $e^{71}$ out of its path of movement, and at such time the sleeve $e^{23}$ will be locked against backward or return movement by the pawl $e^{24}$ engaging a new tooth in the ratchet-ring $e^{25}$, the said parts being thus locked until the latch $e^{52}$, Fig. 5, is released from its coöperating stud on the ring $e^{47}$, whereupon the weight $e^{70}$ will turn the segmental arm $e^{73}$ and the sleeve $e^{23}$ and the parts locked to it by the pawl $e^{24}$ backward or in a direction opposite to that indicated by arrow 60 until the backward movement of the said segmental arm is arrested by a finger or projection $e^{90}$ on the segmental arm $e^{73}$ engaging a stud or upright $e^{91}$, herein represented as forming part of a bracket $e^{93}$, secured to the arm $e$, as by bolts or screws $e^{92}$, (see Fig. 4,) the said bracket being provided with arms $e^{94}$, in which the pulley $e^{72}$ is mounted.

When the worm-gear $e^5$ is rotated by its worm $e^6$ in the direction indicated by arrow 61, Fig. 14, the sleeve $e^4$ and its attached bevel-gear $e^8$ are given a complete revolution to each revolution of the worm-gear $e^5$, the said bevel-gear rotating each buncher through the bevel-pinion $e^{46}$, shaft $e^{45}$, bevel gear or pinion $e^{44}$, and bevel-pinion $e^{43}$, secured to the buncher, and the said worm-gear $e^5$, by reason of the triple teeth on the worm $e^6$, makes three complete revolutions to every complete revolution of the internally-geared ring $e^{12}$, and consequently the sleeve $e^{23}$ and its attached weight $e^{70}$ are locked to the buncher-carrying frame until the latter is released from its retaining-latch $e^{52}$. When the arm $e^{62}$ of the releasing-lever $e^{60}$ disengages the locking-lever $e^{52}$ from its coöperating stud on the ring $e^{47}$, the segmental arm $e^{73}$ and the sleeve $e^{23}$ are rotated in the direction opposite to that indicated by arrow 60, Fig. 14, and the buncher-supporting frame, the standards $e^{41}$, and the ring $e^{47}$, which are locked to the said sleeve by means of the pawl $e^{24}$ and ratchet-ring $e^{25}$, are moved bodily with the sleeve $e^{23}$.

The sleeve $e^{23}$ and its attached arm $e^{73}$ are preferably given less than a quarter-revolution, so that on the return movement of the said sleeve in the direction opposite to that indicated by arrow 60, Fig. 14, the projection $e^{90}$ will engage the upright or stop $e^{91}$ before the latch $e^{52}$ is engaged by a new stud or upright, as $e^{51}$, on the ring $e^{47}$. This construction relieves the buncher-supporting frame, its sustained parts, and the latch $e^{52}$ from strain or shock, such as would be occasioned by the sudden stopping of the weight by the buncher-supporting frame. When the sleeve $e^{23}$ is stopped in its return movement, as described, the momentum carries the buncher-supporting frame and its sustained parts farther to complete a full quarter-turn, or until the stud $e^{51}$ engages the latch $e^{52}$.

As the buncher-supporting frame is turned in the direction opposite to that indicated by arrow 60, which would be in the direction indicated by arrow 70, Fig. 1, a new buncher is presented or brought in line with the tag-delivering device of the tag-tying portion of the machine.

In the machine herein shown the internally-geared ring $e^{12}$ makes one complete revolution for every one hundred revolutions of the shaft $a$, but in order to obtain the desired speed of rotation of the tag receivers or bunchers the latter are geared so that the beveled gear $e^8$ makes three revolutions while the internally-geared ring $e^{12}$ makes one, and the buncher makes ten revolutions for every revolution of the beveled gear $e^8$, so that thirty revolutions of the buncher are obtained for one revolution of the said internally-geared ring. This construction of gearing is especially advantageous on account of the increased speed of rotation of the bunchers, and in practice every succeeding tag or loop is engaged by every third radial arm, there being ten to each buncher in the present instance, which insures the positive entrance of the loop into its proper channel or slot in the buncher and the positive withdrawal of the knotted looped tag from the tag-delivering device.

The bevel-gear $e^{44}$, with which meshes the pinion $e^{43}$ on a buncher, is preferably loose on its shaft $e^{45}$ and is rendered fast thereon to rotate the bevel-pinion $e^{43}$ while the buncher-supporting frame $e^{21}$ is stationary by means of a pawl $e^{100}$, (see Figs. 1 and 34,) pivoted, as at $e^{200}$, to the rear side of the gear $e^{44}$ and provided with an arm $e^{101}$, (see Figs. 4 and 33,) which is extended through a slot in the said gear and engages a tooth of a ratchet-wheel $e^{102}$, fast on the shaft $e^{45}$ and located in front of the gear $e^{44}$. The arm $e^{101}$ may be held in engagement with the ratchet-wheel $e^{102}$, as herein shown, by means of a flat spring $e^{104}$, secured to the pawl $e^{100}$ and engaging a stud or pin $e^{105}$ on the rear face of the gear $e^{44}$, as clearly shown in Figs. 1 and 34. This construction permits the shaft $e^{45}$ and its ratchet-wheel $e^{102}$ to be rotated without producing rotation of the loose gear $e^{44}$ and the bevel-gear $e^{43}$ of the buncher, so that when the buncher-supporting frame is moved to change the position of the bunchers the tag-carrying bunchers are rendered practically stationary and do not revolve, and as a result the tags and their loops are not snarled or mussed up, but are permitted to hang separately and evenly, for by an inspection of Fig. 32 it will be seen that when the shaft $e^{45}$ and its ratchet-wheel $e^{102}$ are moved in the direction of arrow 200 the pawl-arm $e^{101}$ and the pawl $e^{100}$ transmit motion from the ratchet-wheel $e^{102}$ to the gear $e^{44}$, and thereby produce rotation of the buncher-gear $e^{43}$ and its buncher. Now when the buncher-carrying frame is moved bodily, as above described, to change the position of the bunchers with relation to the tag-delivering device the gear $e^{46}$ will be carried around the bevel-gear $e^8$ for a quarter of its circumference, and in this latter bodily movement of the gear $e^{46}$ the latter will be rotated in a reverse direction, that is, in the direction opposite to that indicated by arrow 200, Fig. 32, and the ratchet-wheel $e^{102}$ will, in this rotation of the gear $e^{46}$ and shaft $e^{45}$, click by the pawl-arm $e^{101}$ and will not produce rotation of the gear $e^{44}$, but will leave the gears $e^{44}$ $e^{43}$ and the buncher connected to the gear $e^{43}$ practically stationary, while the buncher-carrying frame is making a quarter-revolution or until the said frame is arrested in its movement by the engagement of the latch $e^{52}$ with the stud $e^{51}$ on the ring $e^{47}$. When the buncher-frame is stopped, as described, the gear $e^{46}$ will be again rotated in the direction of arrow 200 by the gear $e^8$ and the buncher again set in rotation.

The bevel-gear $e^8$, during the bodily movement of the buncher-carrying frame, continues in its rotation and has a tendency to drive the bevel-pinion $e^{46}$ and the shaft $e^{45}$ in the direction indicated by arrow 200, Fig. 32, but the bodily movement of the buncher-carrying frame above referred to has a tendency to drive or rotate the bevel-pinion $e^{46}$ in the direction opposite to the arrow 200, and the bodily movement of the buncher-carrying frame being much faster than the movement of the bevel-gear $b^8$ the said bodily movement predominates, and as a result the bevel-gear $e^{46}$, its shaft $e^{45}$, and the ratchet $e^{102}$ move in the direction opposite to that indicated by arrow 200, Fig. 32, but as soon as the bodily movement of the buncher-carrying frame is arrested by the engagement of one of the studs, as $e^{51}$, with the latch the rotation of the shaft $e^{45}$ and ratchet $e^{102}$ in the direction opposite to that indicated by arrow 200 ceases, and the bevel-gear $e^{44}$ is immediately again rotated in the direction indicated by the arrow 200 to produce rotation of the buncher.

In order that the operator attending the machine may be given a warning that the buncher-supporting frame is about or on the point of being changed automatically, as above described, an audible signal may be provided, which is herein shown as a bell $f$, (see Figs. 4 and 6,) represented as mounted on the upper end of the spindle $e^2$, which latter is shown in said figures as secured to an arm or bracket $f'$, attached to a stationary portion of the machine and herein shown as the bottom or under side of the box $c^3$. The bell $f$ is provided with a tapper or hammer $f^2$, having its arm $f^3$ secured to or forming part of an elbow-lever pivoted to the under side of the arm $e^{61}$ and having its other arm, $f^4$, extended into the path of movement of the pin or stud $e^{64}$ on the internally-geared ring $e^{12}$, the arm $f^4$, as represented in Fig. 5, being shown as provided with an inclined or cam-shaped finger $f^5$, under which passes the stud or pin $e^{64}$ as the ring $e^{12}$ is rotated in the direction indicated by the arrow thereon in Fig. 5. As the stud or pin $e^{64}$ passes under and in engagement with the cam-shaped finger $f^5$ it rocks the elbow-lever and moves the striker-arm $f^3$ away from the bell or gong $f$, so that as the stud or pin $e^{64}$ passes from under and out of engagement with the finger $f^5$ the latter will descend into its normal position and bring the tapper into contact with the bell $f$. The bell-operating arm or lever $f^4$ is located with such relation to the arm $e^{65}$ of the releasing-lever $e^{60}$ that the bell will be operated a little before the arm $e^{65}$ is engaged by the pin $e^{64}$ to bring the arm $e^{62}$ of the said lever into engagement with the latch or locking-lever $e^{52}$ to disengage the latter from a stud on the ring $e^{47}$.

In order that my invention may be clearly comprehended, I will now describe the operation of the complete apparatus herein shown, which includes a loop-forming and tag-tying apparatus and also a coöperating bunching apparatus.

Preparatory to operating the apparatus herein shown, the tags $c'$ are placed in the chute or receptacle $c^2$ with their eyelets or openings in line with each other, and when the said chute has been filled with the requisite or desired number of tags the weight $c^{31}$ is placed in the chute against the uppermost tag, and the string or twine $c$ is then threaded through a longitudinal hole or opening in the block or weight $c^{31}$ and through the eyelets of the tags, which may be accomplished by means of a substantially long needle or other suitable device, and a sufficient portion or length of the string is then carried out from the chute and allowed to fall down over the finger $a^{15}$ of the feeder-arm $a^{14}$, after which the operator starts the main shaft in rotation, which drives the cam-shaft $a$. As the shaft $a$ is rotated the thread-carrying arm $a^{14}$ is moved forward and carries the loose end of the string $c$ to the grippers, and for purpose of illustration we will suppose that the loose end of the string has been brought forward between the jaw $a^4$ and the intermediate jaw $a^6$, which latter is operated by means of the cam-hub $a^8$ to grip the end of the string between it and the jaw $a^4$. The string now occupies substantially the position shown in Figs. 4 and 6, and is in condition to receive a tag from the chute $c^2$.

The tag is withdrawn from its chute, as above described, by the vacuum or suction created by the piston $c^{19}$ and is then released from the nozzle $c^{22}$ of the pipe $c^{10}$ by the destruction of the vacuum, as described, so that the tag hangs freely suspended on the string, between the chute and the jaws, as represented in Fig. 20. The looper is then brought into operation, and a finger $a^{26}$ on an arm $a^{25}$ of the same engages the string and carries it and the tag downward while the looper-shaft is making a quarter-turn, the shoe $a^{34}$ of the arm at such time remaining on the periphery of the cam $a^{35}$ and maintaining the said arm rigid during the time the loop is formed and just previous to the tying of the knot, as will be described.

The looper-arm is kept in engagement with the cam $a^{35}$ while one face or edge of the other-than-round plate $a^{44}$ is in contact with the face of the disk $a^{47}$ on the shaft $a$. The feed-arm $a^{14}$ is then again brought into operation and is moved forward, so as to bring that portion of the string between the looper-arm and the mouth of the chute into position to be engaged by the grippers, as will be described, the said string-carrying arm bringing the portion of the string referred to into the space between the intermediate jaw $a^6$ and the jaw $a^5$, as clearly represented in Fig. 21, thereby forming a loop comprising the two members 200 201, the end of the member 200 being firmly grasped between the jaws $a^4$ $a^6$, while the member 201 is loosely held by the thread-carrier $a^{14}$, which latter remains in this position until the intermediate jaw $a^6$ is moved by its cam $a^8$ to firmly grip the string between it and the jaw $a^5$, as will be described.

When the members 200 201 of the loop are in the position substantially shown in Fig. 21, the said members are in condition to be tied or knotted together and severed from the string $c$, but in order to insure correct working of the knotter the string holder or locking device is brought into operation as follows: The cam $a^{67}$ operates the rack-bar $a^{56}$ (see Fig. 17) and moves it toward the rear of the machine, (viewing Fig. 1,) or in the direction indicated by arrow 400, Fig. 17, to cause the guide-bars $a^{53}$ $a^{54}$ to embrace the members 200 201 of the loop, and at the same time to carry the segmental disk $a^{50}$ beyond the said members, so that on the further movement of the rack-bar $a^{56}$ toward the rear of the machine the said disk is turned in the direction of arrow 21, Fig. 17, so as to bring its finger or projection $a^{51}$ behind the members 200 201 of the loop, thereby locking the said members of the loop and preventing them slipping off the beak of the knotter when the latter is operated, as will now be described.

When the two members of the loop are locked, as just described and as shown in Fig. 21, the knotter occupies the position indicated in Fig. 21 and shown in Fig. 10, the jaws $b'$ $b^7$ of the knotter and the knife $b^{15}$ being at such time closed, the roller $b^{23}$ on the lever $b^{13}$ being out of contact with the cam $b^{24}$.

As the knotter-shaft $b^2$ is rotated, which may be effected, as above described, by means of the sprocket-wheels $b^{35}$ $b^{34}$ and sprocket-chain $b^{32}$, the beak of the knotter, formed by the two jaws $b'$ $b^7$ and the knife $b^{15}$, extends beyond the two members of the loop, as represented in Fig. 21, and the said beak is turned over and under the members of the loop in the direction indicated by arrow 401, Fig. 21, and when the knotter-shaft has made a half-revolution from the position indicated in Figs. 10 and 21 the members of the loop are wound about the beak of the knotter to form a noose, as represented in Fig. 22, the roller $b^{23}$ at such time having been brought into contact with the lower portion of the cam $b^{24}$, thereby compressing the lever $b^{13}$ sufficiently to open the knife $b^{15}$, and at the same time to act on the crank $b^6$ and move the jaw $b^7$ away from the stationary jaw $b'$. On the continued rotation of the knotter-shaft $b^2$ the roller $b^{23}$ travels up the cam $b^{24}$ in the direction indicated by arrow 50, Fig. 9, and when the knotter is brought into substantially the position shown in Fig. 23, with the jaws $b'$ $b^7$ and the knife $b^{15}$ pointing upward, the portion of the members 200 201 of the loop between the jaws of the knotter and the gripping-jaws, which portion is marked 55 in said figure, is in position to have the jaw $b'$ and the jaw $b^7$ and knife $b^{15}$ pass by the said portion on the continued rotation of the knotter-shaft $b^2$. When the open jaws of the knotter have passed by the portion 55 of the loop, the roller $b^{23}$ comes in contact with the enlarged portion $b^{27}$ of the cam $b^{24}$, and permits the lever $b^{13}$ to be moved outward by its spring $b^{20}$ away from the crank $b^6$, thereby permitting the latter to be retracted by its spring $b^8$, so as to close the jaw $b^7$, which on its movement toward the fixed jaw $b'$ firmly grips the portion 55 of the loop between it and the fixed jaw $b'$ of the knotter, and when the loop is thus firmly gripped the roller $b^{23}$ will have passed away from the portion $b^{27}$ of the cam $b^{24}$ and will permit the lever $b^{13}$ to be restored to its original position, thereby closing the knife $b^{15}$, which acts to shear or cut the portion of the loop held by the jaws $b'$ $b^7$ of the knotter from the portion 55, held by the gripping-jaws, leaving the loop still firmly held between the jaws $b'$ $b^7$ of the knotter, as clearly shown in Fig. 24.

The machine is now in condition to tie the knot in the loop, which is effected during a second rotation of the knotter-shaft $b^2$, carrying the knotter downward, as previously described, and when the knotter with the loop held between its closed jaws has been turned downward the noose of the loop is drawn off from the beak of the knotter by the looper-arm and the knot is formed, as represented in Fig. 25.

The loose ends of the loop are at such time firmly held between the jaws $b'$ $b^7$ of the knotter, and are so held until the said jaws are again opened by the roller $b^{23}$ coming in contact with the lower end or tailpiece 57 of the cam $b^{24}$, which cam, during the second revolution of the knotter-shaft $b^2$ to effect the tying of the knot, as above described, is removed out of the path of movement of the roller $b^{23}$ by its eccentric $b^{31}$, which latter rocks the arm $b^{25}$ and its attached cam $b^{24}$ in a backward direction, thereby lifting the tailpiece 57 of the said cam into the path of movement of the roller $b^{23}$, so that the lever $b^{13}$ is depressed sufficiently to open the jaw $b^7$ and knife $b^{15}$ and release the end of the knotted loop.

The noose of the loop is drawn off from the beak of the knotter to form the knot by the looper-arm in engagement with the loop, the said arm acting to draw upon the loop at the second movement of the looper effected by the stud $a^{46}$ on the disk $a^{47}$ engaging a second stud on the plate $a^{44}$. At about the time the noose is drawn off from the beak of the knotter the shoe $a^{34}$ of the looper-arm passes off from the cam $a^{35}$, thus transforming the looper-arm from a rigid to a yielding arm.

While the knot is being formed in the loop, as above described, the rack-bar $a^{56}$ is reciprocated in a backward direction, thereby withdrawing the arm $a^{71}$ of the lever $a^{69}$ from engagement with the stud $a^{72}$ and permitting the said lever to be acted upon by its spring $a^{710}$, which turns the segmental disk $a^{50}$ backward or in a direction opposite to the arrow 21, so as to remove the locking-finger $a^{51}$ from engagement with the loop, and while the loop is being knotted, as above described, the loop carrier or deliverer $d$ is moved toward the front of the machine by the cam $d^5$, so as to bring the point or finger $d^\times$ (see Fig. 19) in front of the loop, and when the knot has been tied and just previous to the loop being released from the jaws of the knotter by the tailpiece 57 of the cam $a^{24}$ the said loop-carrier $d$ is moved backward to engage its finger with the knotted loop below the knot, the said loop at such time being held under tension by the looper-arm, which serves to force the loop into the slot $d'$ of the carrier $d$. The carrier $d$ is moved toward the rear of the machine by its operating-cam $d^5$ a sufficient distance to bring the loop suspended from it into position to be engaged by one of the fingers $e^{33}$ on the buncher in position to be filled, and which in its rotation withdraws the completed loop and its attached tag out of the slot $d'$ of the carrier $d$, and also assists in drawing the loop from off the looper-arm, the latter being turned on its pivot $a^{28}$ against the action of the spring $a^{39}$ by the rotation of the looper-shaft and also by the rotation of the buncher until the looper-arm has been elevated sufficiently to permit the loop to slide off.

The looper-arm, when released from the loop, is returned to its normal position by its spring $a^{39}$, and to avoid wear upon the parts of the looper the looper-arm is cushioned on its return movement by the spring $a^{42}$, as herein shown.

The carrier $d$ may be provided, as shown in Fig. 19, with a spring $d^{100}$, which acts to keep the knotted loop in the slot $d'$ and prevent its jumping out of the slot $d'$ when the loop is released by the knotter and is drawn through the slot $d'$ by the looper-arm. About the time the knife of the knotter severs the loop from the main portion of the spring, the intermediate jaw $a^6$ is turned on its pivot by the cam-hub $a^8$, so as to engage the said intermediate jaw with the jaw $a^5$, and thereby firmly grip the string. After the knife of the knotter has acted to sever the loop from the main portion of the string and from the portion 55, held by the grippers, and after the end of the string is gripped between the jaws $a^6$ $a^5$, the rotary brush $d^{24}$ is brought into action, as above described, and serves to brush from between the grippers the loose piece 55 of the string, which has been released by the jaw $a^6$ withdrawing from the jaw $a^4$.

When the predetermined number of completed tags has been delivered to one of the bunchers, which number, for sake of illustration, may be supposed to be one hundred, the buncher-supporting frame is moved, as above described, by the operation of the releasing device acting on the latch or locking device $e^{52}$, and the full buncher is removed out of line with the tag-delivering device $d$, and an empty buncher is brought in line with the said device to be filled thereby, the full buncher being moved into position to enable the operator to conveniently gather the suspended looped tags on the full buncher.

By reason of the channels or passage-ways $e^{34}$ in the buncher merging together into a common central opening, as above described, the operator merely encircles with his hand the loops of the tags and prevents the same revolving with the buncher, which continues to still revolve, and as the latter revolves the loops are forced by the curve of the slot into the discharge or central opening $e^{300}$, from which the completed bunch is readily removed, after which the loops may be secured together, as by a string, in the ordinary manner of hand-tying.

Referring again to Figs. 1, 11, and 12, it will be noticed that the pivots $a^{28}$ of the looper-arms are set inclined or at an other-than-right angle to the disk $a^{30}$, which results in the carrying of the looper-arm in engagement with the loop of the tied bag toward the bunching apparatus and out of the path of movement of the next succeeding looper-arm, as clearly shown in Figs. 1 and 11. In the normal position of the looper-arms, that is, while they are inoperative, their pivots $a^{28}$ are inclined in such direction as to bring the inoperative arms substantially at right angles to the looper-shaft, but in the revolution of the looper-carrying disk $a^{30}$ the angular position of the pivots $a^{28}$ with relation to the said disk is reversed, so that the looper-arm in engagement with the loop of a tied tag, when brought down into the position represented in Figs. 11 and 12, is no longer at right angles to the looper-shaft, but inclines at an angle thereto toward the back of the looper-disk, that is, toward the bunching apparatus, thereby bringing the tied rag and its loop into better position to be taken off by the buncher.

In the machine herein shown the knotter is given two revolutions to one of the shaft $a$ by making the sprocket-wheel $b^{35}$ one-half the size of the sprocket-wheel $b^{34}$.

The loop-tying portion of the machine is herein shown as forming part of a tag stringing and tying machine, but it is evident that if it was so desired the tag-feeding mechanism and the tags contained in the chute might be omitted and the remaining portion of the tag-tying machine might be employed alone to form knotted or tied loops from a continuous string, and therefore I do not desire to limit my invention in this respect.

In Figs. 11 and 12 I have shown a preferred form of looper mechanism, but instead thereof the said looper mechanism may be of other constructions, as, for instance, such as shown in Figs. 11$^a$, 12$^a$, and 13$^a$. Referring to Figs. 11$^a$ and 12$^a$, the looper mechanism is shown as a disk $f^\times$, provided with a peripheral flange or rim $f^{10}$, within which is located a cam $f^{20}$, held stationary upon the looper-shaft $a^{31}$ by the arm $a^{37}$. The rim $f^{10}$ of the looper-carrying disk has secured to it, as represented in Figs. 11$^a$ and 12$^a$, four loop-forming arms, each of which is composed, as herein shown, of a reciprocating rod $f^{30}$, extended through a tube or barrel $f^{40}$, fastened in suitable manner to the rim $f^{10}$ and in line with a suitable hole or opening in the said rim, through which latter the rod $f^{30}$ is adapted to enter within the rim of the disk. The rod $f^{30}$, as shown in Fig. 12$^a$, is reduced in diameter near its front end, and the reduced portion is encircled by a spring $f^{50}$, bearing against a shoulder on the rod $f^{30}$ and against the head $f^{60}$ of the barrel or tube $f^{40}$. The reciprocating rod $f^{30}$ is adapted to be moved downward in the barrel $f^{40}$ against the action of the spring $f^{50}$ by the cam $f^{20}$, as the looper-carrying disk $f^\times$ is moved about the said cam in the direction indicated by the arrow 500. The rod or arm $f^{30}$ when moved into its outermost position (represented at the right in Fig. 12$^a$) engages the string to form the loop in a similar manner to the bent finger $a^{26}$ of the looper-arm $a^{25}$, (shown in Fig. 12,) and when the disk $f^\times$ has been turned so as to move the rod or arm $f^{30}$ from engagement with the enlarged portion of the cam $f^{20}$ the spring $f^{50}$ acts to move the rod or arm $f^{30}$ within its tube or barrel $f^{40}$ and withdraws it from engagement with the loop, and when the rod or arm $f^{30}$ is moved into its barrel or tube $f^{40}$ and into the position represented at the bottom of Fig. 12$^a$ the loop is still held taut by an auxiliary finger or arm $f^{100}$, herein shown as fastened to a lever $f^{12}$, pivoted, as at $f^{13}$, to supporting-arms $f^{14}$, fastened to the tube or barrel $f^{40}$, the lever $f^{12}$ being normally held substantially close to the tube by a spiral spring $f^{15}$, represented as encircling the tube $f^{40}$ and fastened at the opposite sides of the lever $f^{12}$, as clearly shown in Fig. 12ª.

The tube or barrel $f^{40}$ is represented in Fig. 12ª as provided at or near its outer end with a guard $f^{16}$, preferably made of bent wire, which guard serves to prevent the string sliding down too far on the looper-arm. The guard $f^{16}$, if desired, may be applied to the arm $a^{25}$ of the looper shown in Fig. 12.

Referring to Fig. 13, it will be noticed that the looper-carrying disk $a^{30}$, which is adjustably secured to the disk $a^{300}$ by bolts or screws $a^{301}$, extended through the slots $a^{302}$, is provided with graduations or marks $f^{200}$, with which register an index or pointer $f^{210}$ on the disk $a^{300}$, by which means the adjustment of the disk $a^{30}$ with relation to the disk $a^{300}$, and thereby with relation to the looper-shaft, may be accurately determined, for if it is desired to change the position of the looper-arms to obtain different lengths of loops, the looper-carrying disk $a^{30}$ may be changed, as, for instance, from the position indicated in Fig. 13, either forward or backward, and the extent of adjustment or movement of the disk may be readily known from the position of the index $f^{210}$ with relation to the scale $f^{200}$. The looper mechanism shown in Fig. 13ª is provided with a similar finger and index scale.

By reference to Fig. 28 it will be noticed that the spring $a^{12}$ is fastened to the movable jaw $a^5$ of the gripping mechanism, and that the spring $a^{13}$ is fastened to the movable jaw $a^4$. When the intermediate jaw $a^6$ is moved by the switch-cam $a^8$, so as to grip the string between it and the jaw $a^4$, the spring $a^{12}$ acts on the tailpiece of the jaw $a^4$ and forces it against the intermediate jaw $a^6$. In the same manner, when the intermediate jaw $a^6$ is moved to grip the string between it and the jaw $a^5$, the spring $a^{13}$ acts against the tailpiece of the jaw $a^5$ to force the said jaw toward the intermediate jaw $a^6$. In this manner the string is firmly held alternately between the said jaws.

When the intermediate jaw $a^6$ coöperates with the jaw $a^4$, the tailpiece of the jaw $a^5$ is brought into engagement with the stop $a^{10}$, (shown in Fig. 27,) which prevents the front portion of the jaw $a^5$ from following the movement of the intermediate jaw and the jaw $a^4$, thereby leaving an opening between the intermediate jaw and the jaw $a^5$, into which the second half or member of the loop is brought by the feeder $a^{14}$, as represented in Fig. 21. When the intermediate jaw $a^6$ coöperates with the jaw $a^5$, the tailpiece of the jaw $a^4$ is brought into engagement with the stop $a^{10}$ to arrest the movement of the jaw $a^4$, and thereby leave an opening between it and the intermediate jaw $a^6$ for the admission of the string, as above described.

In the present instance I have chosen to show the switch-cam $a^8$ as provided with four peripheral grooves, forming two tracks or paths, but I do not desire to limit my invention in this respect, as it is evident that the two grooves 2 3 may be formed into a single groove and the two grooves 4 5 into a like groove, and the follower be made solid instead of forked, as shown in the present instance. Furthermore, I prefer to construct the grippers as herein shown, but I do not desire to limit my invention in this respect, as instead thereof I may employ two independent sets of jaws, the intermediate jaw $a^6$ in the present arrangement practically constituting a double jaw.

I claim—

1. In an apparatus for forming knotted or tied loops from a continuous string, the combination of the following instrumentalities; viz: a gripping mechanism to hold the string or cord to be formed into loops, a looper to act on the string to form one half or member of the loop, a feeder to carry the string to the gripping mechanism to form the other half or member of the loop, and a knotter to tie the loop, substantially as described.

2. In an apparatus for forming knotted or tied loops from a continuous string, the combination of the following instrumentalities; viz: a gripping mechanism to hold the string or cord to be formed into loops, a looper to act on the string to form one half or member of the loop, a feeder to carry the string to the gripping mechanism to form the other half or member of the loop, a knotter to tie the loop, and means to sever the loop from the string, substantially as described.

3. In an apparatus for forming knotted or tied looped tags, the combination of the following instrumentalities; viz: a tag holder or support, a gripping mechanism to hold the string or cord to be formed into loops, a feeder to carry the string to the gripping mechanism, a tag-feeding mechanism, a looper to act on the string to form one half or member of the loop, a knotter to tie the loop, and means to sever the loop from the string, substantially as described.

4. In an apparatus for forming knotted or tied loops from a continuous string, the combination of the following instrumentalities; viz: a gripping mechanism to hold the string or cord to be formed into loops, an intermittently-operated looper to act on the string to form one half or member of the loop, a feeder to carry the string to the gripping mechanism to form the other half or member of the loop, and a knotter to tie the loop, substantially as described.

5. In an apparatus for forming knotted or tied looped tags, the combination of the following instrumentalities; viz: a loop-holder provided with a passage-way to receive both members of the loop, and a locking device to retain both members of the loop in the said passage-way, while the knot is being tied, and a cutter or knife to sever the tied loop from the string, substantially as described.

6. In an apparatus for forming looped tags from a continuous non-metallic cord or string, the combination with a gripping mechanism to hold the string while a loop is being formed, of a vacuum tag-feeding mechanism operated intermittently to place one of a plurality of tags on the portion of the string to be formed into a loop, and a loop-forming mechanism, substantially as described.

7. In an apparatus for forming looped tags from a continuous non-metallic cord or string, an intermittently-operated looper provided with a plurality of loop-forming arms or projections, substantially as described.

8. In an apparatus for forming looped tags from a continuous non-metallic cord or string, the combination of the following instrumentalities, viz: a tag holder or support holding a plurality of tags having eyelets, a string inserted through said eyelets, a gripping mechanism to hold the string while a loop is being formed, a tag-feeding device to carry one of the tags toward the gripping mechanism, and a loop-forming device to act on that portion of the string between the tag-holder and the gripping mechanism, substantially as described.

9. In an apparatus for forming knotted or tied loops from a continuous string, the combination of the following instrumentalities, viz: a gripping mechanism to hold the string or cord to be formed into loops, a looper to act on the string to form one half or member of the loop, a looper-actuating mechanism comprising a looper-arm, a shaft to which said arm is secured, a disk or plate of other than round shape provided with a plurality of studs or projections, a disk provided with a slotted or open portion and having a stud or projection to engage the studs or projections on the other than round disk or plate, a shaft on which said slotted disk is mounted, and means to rotate said shaft, a feeder to carry the string to the gripping mechanism to form the other half or member of the loop, and a knotter to tie the loop, substantially as described.

10. In an apparatus for forming looped tags from a continuous non-metallic cord or string, the combination with a gripping mechanism comprising jaws $a^4$ $a^5$ and an intermediate jaw $a^6$ provided with a follower, of a switch-cam having two tracks or ways to operate said intermediate jaw to engage it alternately with the jaws $a^4$ $a^5$, and a string-feeder to coöperate with said jaws, substantially as described.

11. In an apparatus for forming looped tags from a continuous non-metallic cord or string, the combination with a gripping mechanism comprising jaws $a^4$ $a^5$ and an intermediate jaw $a^6$, of a switch-cam to operate said intermediate jaw to engage it alternately with the jaws $a^4$ $a^5$, a string-feeder to coöperate with the said jaws, and a brush intermittently brought into engagement with the jaws $a^4$ $a^5$ from which the jaw $a^6$ is moved by the switch-cam, substantially as described.

12. The combination with an apparatus for forming knotted or tied looped tags, of a tag-assembling apparatus comprising a movable device provided with a slot into which the knotted tags are passed and suspended therein, substantially as described.

13. The combination with an apparatus for forming knotted or tied looped tags, of a plurality of movable devices constructed to receive the loops of the tags, and an intermittently-movable frame or support for said devices, substantially as described.

14. The combination with an apparatus for forming knotted or tied looped tags, of a tag-assembling apparatus provided with a slot or channel to receive both members of the loop of a tied tag and suspend the same by the knot formed in the loop, substantially as described.

15. The combination with an apparatus for forming knotted or tied looped tags, of a tag-assembling apparatus constructed to receive the loop of the tied tag, and an intermediate movable loop-delivering device to receive the tied looped tag and to carry it to the assembling apparatus, substantially as described.

16. The combination with an apparatus for forming knotted or tied looped tags from a continuous non-metallic cord or string, of a tag-assembling mechanism comprising a plurality of rotating tagged loop-receiving devices, and an intermittently-rotated frame supporting said devices, substantially as described.

17. In a tag assembling or bunching apparatus, a rotary tag receiving or holding device, mechanism to rotate it, a rotatable supporting-frame for said tag-receiving device, a locking device for said supporting-frame, and means to engage said locking device at intervals to release the said supporting-frame and permit it to be rotated, substantially as described.

18. In a tag assembling or bunching apparatus, the combination of the following instrumentalities; viz: a plurality of movable bunchers, a movable supporting-frame therefor, a locking device to hold said supporting-frame stationary, gearing to move said bunchers, a releasing device coöperating with the said locking device, gearing to operate said releasing device, and means to move said supporting-frame when released, substantially as and for the purpose specified.

19. In a tag assembling or bunching apparatus, the combination of the following instrumentalities; viz: a plurality of movable bunchers, a movable supporting-frame therefor, a locking device to hold said supporting-frame stationary, gearing to move said bunchers, a releasing device coöperating with the said locking device, gearing to operate said releasing device, means to move said supporting-frame when released, and means to permit the said bunchers to remain substantially stationary when the said supporting-frame is moved, substantially as described.

20. In a tag assembling or bunching apparatus, the combination of the following instrumentalities; viz: a plurality of rotatable loop-receiving devices, gearing to rotate said devices, an intermittently-rotatable frame supporting said loop-receiving devices, a locking device for said frame, and a releasing device to unlock said frame and permit it to be rotated, for the purpose specified.

21. In a tag assembling or bunching apparatus, the combination of the following instrumentalities; viz: a plurality of rotatable loop-receiving devices, gearing to rotate said devices, an intermittently-rotatable frame supporting said loop-receiving devices, a locking device for said frame, and a releasing device to unlock said frame, and means to rotate said frame when released, substantially as described.

22. In a tag assembling or bunching apparatus, the combination of the following instrumentalities; viz: a plurality of rotatable loop-receiving devices, gearing to rotate the said devices, a driving mechanism for said gearing, an intermittently-rotatable frame supporting said loop-receiving devices, a locking device for said frame, mechanism to produce intermittent movement of the said frame, a clutch to couple the said mechanism to the said frame, and a releasing device to act on said locking device to release the said frame and permit it to be rotated by its actuating mechanism, substantially as described.

23. In a tag assembling or bunching apparatus, the combination of the following instrumentalities; viz: a plurality of movable bunchers, a movable supporting-frame therefor, a locking device to hold said supporting-frame stationary, gearing to move said bunchers, a releasing device coöperating with the said locking device, gearing to operate said releasing device, means to move said supporting-frame when released, and an audible signal actuated by the said releasing device, substantially as described.

24. In a tag assembling or bunching apparatus, the combination of the following instrumentalities; viz: a rotary loop-receiving device provided with slots or channels to receive the loop of the tied tag, a support for said device and gearing to rotate said device, substantially as described.

25. In a tag assembling or bunching apparatus, the combination of the following instrumentalities; viz: a movable loop-receiving device provided with slots or channels to receive the loop of the tied tag, and means to move said device, substantially as described.

26. The combination with an apparatus for forming knotted or tied looped tags, of a loop-receiving device provided with a channel or guideway between the walls of which both members of the loop are received and suspended therein, substantially as described.

27. The combination with an apparatus for forming knotted or tied looped tags, of a loop-receiving device provided with a curved channel or guideway between the walls of which both members of the loop are received and suspended therein, substantially as described.

28. The herein-described buncher provided with a plurality of curved channels or guideways communicating with a common discharge-opening, substantially as described.

29. In an apparatus for forming knotted or tied loops, the combination with a knot-forming device comprising a stationary jaw $b'$ and a movable jaw $b^7$ and a cutter or knife $b^{15}$ coöperating with the said jaws to form a beak, a crank or arm $b^6$ connected to the movable jaw $b^7$ a lever $b^{13}$ to which said knife is attached adapted to act on the crank or arm $b^6$ to open the jaw $b^7$, a cam to act on the said lever to open the knife means to close the said knife, and means to close the movable jaw independent of the knife, substantially as described.

30. In an apparatus for forming knotted or tied loops, the combination with a rotary knotting device comprising holding-jaws, and a knife coöperating therewith and a lever to which the said knife is attached, of a cam to act on the said lever to open the said jaws and knife, and means to move the said cam into and out of the path of movement of the said lever, whereby the said cam is rendered active to operate upon the said lever during one revolution of the said knotting device and is rendered inactive for the whole or a portion of the second revolution of the said knotting device, substantially as and for the purpose specified.

31. In an apparatus for forming knotted or tied loops, the combination with a rotary knotting device comprising a fixed and movable jaw, and a lever to act on the movable jaw, of a cam to act on the said lever to open the said jaws, and means to move the said cam into and out of the path of movement of the said lever, substantially as described.

32. In an apparatus for forming knotted or tied loops, the combination with a knotting device consisting of a fixed jaw and a movable jaw and a knife coöperating therewith attached to a lever adapted to operate upon the movable jaw, of a cam coöperating with the said lever and shaped to cause the said lever to act upon the movable jaw of the knotter while the said lever is acted upon by one portion of the cam and to permit the said lever to be moved out of engagement with the said movable jaw, to permit the said movable jaw to close while the lever still remains in engagement with its operating-cam, and means to act upon the said lever to close the knife when the said lever is out of engagement with the cam, substantially as described.

33. In an apparatus for forming knotted or tied loops, a looper comprising a plurality of movable arms, and a cam coöperating with said arms, substantially as described.

34. In an apparatus for forming knotted or tied loops, a looper comprising a movable arm, and a cam coöperating with said arm and about which the said arm is carried, substantially as described.

35. In an apparatus for forming knotted or tied loops, a looper comprising a plurality of movable arms, a disk to which said arms are secured, a rotary shaft upon which the said disk is fastened, and a stationary cam loosely mounted on the said shaft and coöperating with the looper-arms, substantially as described.

36. In an apparatus for forming knotted or tied loops, a looper comprising a plurality of movable arms, a disk to which the said arms are secured, a shaft upon which the said disk is adjustably mounted, and a stationary cam loosely mounted on the said shaft and coöperating with the said arms, substantially as described.

37. In an apparatus for forming knotted or tied loops, a loop-holding device comprising slotted arms $a^{53}$ $a^{54}$ and a movable finger normally out of line with the slot between the said arms, but adapted to be brought across the said slot to operate, substantially as described.

38. In an apparatus for forming knotted or tied looped tags, from a continuous string having thereon a plurality of tags, an inclined tag-containing chute or receptacle provided at its mouth with stops or rests and having on its inclined bottom a ratchet-bar, and a movable weight in said chute provided with a hole through which the said string is passed and having an opening, and a pawl pivoted in said opening to engage the ratchet-bar to prevent backward movement of the said weight, substantially as and for the purpose specified.

39. The combination with an apparatus for forming knotted or tied loop-tags, of a slotted loop-receiving device, and an intermediate loop-delivering device provided with a slot to receive the loop, and with a device for retaining the said loop within the slot of the delivering device until positively removed, substantially as described.

40. In a tag assembling or bunching apparatus, the combination of the following instrumentalities; viz: a spindle, a sleeve loosely mounted thereon, a gear secured to said sleeve, a worm in engagement with said gear to rotate said sleeve, a bevel-gear $e^8$ connected to said sleeve to rotate therewith, a rotary slotted loop-receiving device, a frame mounted on said sleeve and supporting said loop-receiving device, gearing carried by said frame and connecting the rotary loop-receiving device with the bevel-gear $e^8$, an internally-geared ring supported above the gear $e^8$ and rotated therefrom, a locking device for said frame, a releasing device coöperating with the said locking device and operated by the internally-geared ring, and mechanism to produce rotation of the said frame when unlocked by the releasing device, substantially as described.

41. In a tag assembling or bunching apparatus, the combination of the following instrumentalities; viz: a spindle, a sleeve loosely mounted thereon, a gear secured to said sleeve, a worm in engagement with said gear to rotate said sleeve, a bevel-gear $e^8$ connected to said sleeve to rotate therewith, a rotary slotted loop-receiving device, a frame mounted on said sleeve and supporting said loop-receiving device, gearing carried by said frame and connecting the rotary loop-receiving device with the bevel-gear $e^8$, an internally-geared ring supported above the gear $e^8$ and rotated therefrom, a locking device for said frame, a releasing device coöperating with the said locking device and operated by the internally-geared ring, a spool $e^{23}$ mounted on the said sleeve, a clutch to couple the spool to the said frame, and mechanism operated by the worm-gear to partially rotate the said spool without producing rotation of the said frame, and means to rotate the said spool and the said frame in a reverse direction when the frame is released from its locking device, substantially as described.

42. In a tag assembling or bunching apparatus, the combination of the following instrumentalities; viz: a spindle, a sleeve loosely mounted thereon, a gear secured to said sleeve, a worm in engagement with said gear to rotate said sleeve, a bevel-gear $e^8$ connected to said sleeve to rotate therewith, a rotary slotted loop-receiving device, a frame mounted on said sleeve, a shaft carried by said frame and provided with a pinion in mesh with the bevel-gear $e^8$, a bevel-gear loosely mounted on the said shaft and in engagement with a pinion on the slotted loop-receiving device, a ratchet disk or wheel fast on the said shaft, a pawl carried by said loose gear and adapted to engage said ratchet wheel or disk to render the said loose gear fast on the shaft, substantially as described.

43. In an apparatus for forming knotted or tied loops, the combination with a gripping mechanism comprising two movable jaws $a^4 a^5$ and an intermediate jaw $a^6$ pivotally connected together, and springs to act on the said jaws, of a stop to arrest the movement of the said jaws, substantially as described.

44. In an apparatus for forming knotted or tied loops, a looper mechanism comprising a supporting-disk, a pivoted looper-arm, and a pivot for the said looper-arm set at an other than right angle to the supporting-disk, substantially as and for the purpose specified.

45. In an apparatus for forming knotted or tied loops, a looper mechanism comprising a stationary cam, a movable disk provided with a plurality of pivoted looper-arms having shoes to engage said cam, and a spring normally acting on said looper-arms to place the shoes in position to engage with the said cam, substantially as described.

46. In an apparatus for forming knotted or tied loops, a looper mechanism comprising a disk provided with circumferential lugs or projections $a^{41}$, a plurality of pivoted looper-arms having shoes normally positioned between the said circumferential lugs or projections, a spring to act on the said arms to return the said arms and their shoes into their normal position, and a buffer carried by the circumferential lugs and acting upon the looper-arms to cushion the return blow of the said arms, substantially as described.

47. In an apparatus for forming knotted or tied loops, the combination with a gripping mechanism comprising two jaws as $a^4$ $a^5$ and an intermediate jaw $a^6$ provided with a follower, of a switch-cam having two tracks or ways, one of the said ways acting on the follower to move the intermediate jaw toward the jaw $a^4$, and the other track or way acting on the follower to move the intermediate jaw toward the jaw $a^5$, the track or way with which the follower is engaged when the intermediate jaw is moved to operate with the jaw $a^5$, being carried toward the other track or way for a portion of its length, as and for the purpose specified.

48. The combination with an apparatus for forming knotted or tied looped tags, of a loop-delivering device provided with a slit to receive both members of the loop of the tied tag, and means to oscillate the said slitted device, substantially as described.

49. In an apparatus for forming knotted or tied loops, the combination of the following instrumentalities, viz: a fixed jaw, a movable jaw coöperating with the fixed jaw to grasp the members of the loop, a knife or cutter to act on the members of the loop after the same have been grasped between the said fixed and movable jaws, means to effect the movement of both the movable jaw and the cutter in one direction, and means to close the movable jaw independent of the said cutter, and means to close the cutter after the movable jaw is closed, substantially as described.

50. In an apparatus for forming knotted or tied looped tags from a continuous string, the combination of the following instrumentalities, viz: a gripping mechanism to grip the string, a loop-holder provided with a slot or passage-way to receive both members of the loop, a locking device to close the said passage-way and lock both members of the loop in its holder, and a knotting device to act on that portion of both members of the loop between the loop-holder and the gripping mechanism, substantially as described.

In testimony whereof I have signed my name to this specification in the presence of two subscribing witnesses.

JOHN P. SWIFT.

Witnesses:
JAS. H. CHURCHILL,
J. MURPHY.